United States Patent
Zhang et al.

(10) Patent No.: US 6,842,563 B2
(45) Date of Patent: Jan. 11, 2005

(54) WAVEGUIDE GRATING-BASED WAVELENGTH SELECTIVE SWITCH ACTUATED BY MICRO-ELECTROMECHANICAL SYSTEM

(75) Inventors: Jiangjun Zhang, Cupertino, CA (US); Peiching Ling, San Jose, CA (US); Jinliang Chen, Saratoga, CA (US); Ming Xu, San Jose, CA (US)

(73) Assignee: Oplux, Inc., Sunnyvale, CA (US)

( * ) Notice: Subject to any disclaimer, the term of this patent is extended or adjusted under 35 U.S.C. 154(b) by 265 days.

(21) Appl. No.: 10/177,632

(22) Filed: Jun. 19, 2002

(65) Prior Publication Data

US 2003/0077031 A1 Apr. 24, 2003

Related U.S. Application Data

(60) Provisional application No. 60/348,927, filed on Oct. 22, 2001, now abandoned.

(51) Int. Cl.[7] .............................................. G02B 6/28
(52) U.S. Cl. ........................................ 385/24; 385/15
(58) Field of Search ............................ 385/2, 4, 8, 10, 385/14, 15, 16, 17, 37, 40, 130, 131, 901, 24

(56) References Cited

U.S. PATENT DOCUMENTS 5,664,032 A  *  9/1997  Bischel et al. ................. 385/4

* cited by examiner

Primary Examiner—Karl D. Frech
(74) Attorney, Agent, or Firm—Bo-In Lin

(57) ABSTRACT

The present invention is a wavelength-selective optical switching system. The switching system includes an input waveguide designated as waveguide WG(0) for receiving a multiplexed optical signal comprising optical signals transmitted over a plurality of wavelength channels represented by $\lambda_1, \lambda_2, \lambda_3, , \lambda_N$, where N is a positive integer wherein the input waveguide extending over a first direction. The switching system further includes a two dimensional waveguide array comprising a plurality of first direction waveguides WG(i), i=1, 2, 3, , M extending over the first direction substantially parallel to the input waveguide WG(0) where M is a positive integer and a plurality of second direction waveguides WG'(j), j=1, 2, 3, N, extending over a second direction substantially perpendicular to the first direction and intersecting with the input waveguide and each of the first direction waveguide WG(i), i=0, 1, 2, 3, ,M, thus forming (M+1)×N intersections. The switching system further includes a plurality of wavelength selective grating-based switches SW(i, j) where i=0, 1, 2, 3, , M and j=1, 2, 3, , N, each disposed on one of the (M+1)×N intersections for selectively transmitting an optical signal of wavelength λj into a waveguide WG'(j) and for selectively transmitting an optical signal of a predefined combination of wavelengths into at least one of the waveguide WG(i) for i=1, 2, 3, M.

51 Claims, 26 Drawing Sheets

"ON"

"OFF"

WAVEGUIDE GRATING-BASED WAVELENGTH SELECTIVE SWITCH ACTUATED BY MICRO-ELECTROMECHANICAL SYSTEM

This application claims priority to U.S. provisional patent application entitled WAVEGUIDE GRATING-BASED WAVELENGTH SELECTIVE SWITCH ACTUATED BY MICRO-ELECTROMECHANICAL SYSTEM filed Oct. 22, 2001 abandoned by Zhang et al. and accorded Ser. No. 60/348,927, the benefit of its filing date being hereby claimed under Title 35 of the United States Code.

BACKGROUND OF THE INVENTION

1. Field of the Invention

This invention relates generally to technologies for switching and routing optical wavelengths. More particularly, this invention relates to innovative method, structures and processes to manufacture micro-electromechanical system (MEMS)-actuated, waveguide grating-based wavelength selective switches.

2. Description of the Related Art

Current state of the art in optical switching and signal transmission systems are limited to optical switching of an entire spectral range without wavelength differentiation or selection. Due to the lack of wavelength selection, an optical switch operation must frequently operate with a wavelength de-multiplexing and multiplexing device to achieve a purpose of transferring optical signals of different wavelengths to different ports. This requirement leads to more complicate system configurations, higher manufacture and maintenance costs, and lower system reliability. For this reason, even that optical switches provide an advantage that the optical signals are switched entirely in the optical domain without converting them into the electrical domain, the cost and size of application cannot be easily reduced. There is a strong demand to further improving the optical switches because optical switches are considered as critical enabling technology of optical-fiber networks. In the WDM networks of the past, adding, dropping or cross connecting of individual wavelengths has involved conversion of the signal back to the electrical domain. Development of all-optical switches for applications ranging from add-drop functionality to large-scale cross-connects is key to adding intelligence to the optical layer of the optical networking systems. However, with the current technical limitations, all fiber network systems implemented with optical switches are still quite expensive.

Due to the extremely wide transmission bandwidth provided by optical fiber, all-optical fiber networks are increasingly being used as backbones for global communication systems. To fully exploit the fiber bandwidth in such networks, wavelength-division multiplexing (WDM) and wavelength-division demultiplexing (WDD) technologies are employed so that an individual optical fiber can transmit several independent optical streams simultaneously, with the streams being distinguished by their center wavelengths. Since these optical streams are coupled and decoupled based on wavelength, wavelength selective devices are essential components in WDM communication networks. In the past, wavelength selective devices performed the adding, dropping and cross connecting of individual wavelengths by first converting the optical signal into the electrical domain. However, the development of all-optical WDM communication systems has necessitated the need for all-optical wavelength selective devices. It is desirable for such devices to exhibit the properties of low insertion loss, insensitivity to polarization, good spectral selectivity, and ease of manufacturing.

In today's all-optical Dense WDM (DWDM) networks, three prevailing types of wavelength selecting technology are used: (1) Thin Film Filter (TFF), (2) Arrayed Waveguide (AWG), and (3) Fiber Bragg Grating (FBG). Currently, TFF technology is the predominant choice when the spacing requirements of the wavelength selective device are greater than 100 GHz. The advantages of TFF-based devices are that they are relatively insensitive to temperature, have minimal cross talk, and provide good isolation between different wavelengths. However, devices built using current TFF technology have the following disadvantages: they are difficult to manufacture when the spacing requirement is below 200 GHz; the packaging cost is very high; and the yield is low. Due to these disadvantages, when the spacing requirements are 100 GHz and below, AWG and FBG wavelength selecting devices dominate the market. The advantages of AWG devices are they can support high channel counts, are easy to manufacture, and have a small silicon footprint. Meanwhile, the disadvantages are that AWG devices are prone to cross talk and their packaging is complex. FBG, the second dominant technology when the spacing requirements are 100 GHz and below, has the advantages of short development time, low capital investment, and low packaging cost. However, the FBG products available in the current market have relatively high power loss. Moreover, each channel requires a circulator, which increases component costs and possibly increases packaging costs.

Furthermore, there are several optical switching technologies under development today. These switching technologies are as follows: Micro Electro-Mechanical Systems (MEMS), Liquid Crystals, Thermal-Optics, Holograms, Acousto-Optic, etc. Among all these optical switching technologies, MEMS is emerging to be the most promising technology, as benefited from its potential of batch processing and cheap replication, as well as its sound-record on reliability in a wide range of applications. All the other technologies are still in the experimental stage and need years to become reliable enough for commercial applications. FIGS. 1A and 1B are functional block diagrams showing two alternate embodiments of MEMS optical switches. In FIG. 1A, the MEMS optical switch is implemented with a de-multiplexing device to first separate the input signals into multiple channels each having a specific central wavelength transmitted over a specific waveguide. Optical switching operations are performed for each of these de-multiplexed signals. Then a multiplexing device is employed to multiplex these switched signals into DWDM signals for transmission over optical fibers. FIG. 1B is a wavelength selective optical switch implemented with a de-multiplexing device to first separate the optical signal into channels of different wavelengths. The optical switching operations are carried out for each channel and these channels are connected to optical output ports. Again, a de-multiplexing operation must be performed first before wavelength selective switching can be carried out.

There are two types of optical MEMS switch architectures under development, or commercially available: mechanical and micro-fluidic. Mechanical-type MEMS-based switches use arrays of miniaturized mirrors fabricated on a single chip. The optical signal is reflected off this tiny mirror in order to change the transmission channel. Micro-fluidic-type MEMS-based switches, on the other hand, have no moving mirrors. Rather, they rely on the movement of bubbles in micro-machined channels.

Mechanical-type MEMS-based switches can be further classified into two catalogs according to mirror movement: two-dimensional (2-D) switches and three-dimensional (3-D) switches. In 2-D switches, the mirrors are only able to execute a two-position operation—that is, the mirrors can move either up and down or side by side. In 3-D switches, the mirrors can assume a variety of positions by swiveling in multiple angles and directions. These products (2-D switches or 3-D switches) are able to offer such benefits as excellent optical performance, minimal cross-talk, and the promise of improved integration, scalability, and reliability. On the other hand, these products and their methods of use are disadvantageous in the following aspects: first, in these switches, light travels through free space, which causes unbalanced power loss. Secondly, in order to steer each mirror, three to four electrodes need to be connected to each mirror, which is a major challenge to produce large-scale mechanical-type MEMS-based switches. Thirdly, alignment and packaging are difficult tasks particularly for large-scale switches.

While above-mentioned micro-mirror-based approach is widely taken by most major companies to build up their MEMS-based optical switches, Agilent Technology, Inc. has developed micro-fluidic-type MEMS-based switches by combining its micro-fluidics and ink-jet printing technology. In these switches, an index-matching fluid is used to switch wavelengths. This fluid enables transmission in a normal condition. To direct light from an input to another output, a thermal ink-jet element creates a bubble in the fluid in a trench located at the intersection between the input waveguide and the desired output waveguide, reflecting the light by total internal reflection. The advantages of these switches are that they have no moving mechanical parts and are polarization independent. The disadvantages of these devices are their reliability issues and the insertion loss issue for the large-scale switches.

A common drawback of both of these two types of MEMS-based switches is the requirement to work with external de-multiplexing and re-multiplexing devices in order to function properly in an optical networking system. The requirements of implementing de-multiplexing and re-multiplexing functions add tremendous complexities to the system configuration and significantly increase the cost of manufacture, system installation, and maintenance of the optical network systems. Another drawback of both of these two types of MEMS-based switches is that these prior-art switching systems are not wavelength selective switches. In another word, the switching systems cannot selectively switch a particular wavelength from an input waveguide to a desired output waveguide. In short, they are not wavelength intelligent devices. To add wavelength intelligence to optical switches, Bragg grating has been shown to have excellent wavelength selection characteristics. A Bragg grating behaves as a wavelength-selective filter, reflecting a narrow band of wavelengths while transmitting all other wavelengths. The Massachusetts Institute of Technology (MIT) has developed a technology for building Bragg grating devices in planar optical waveguides. These so-called integrated Bragg gratings offer many advantages over the fiber Bragg grating, according to MIT. However, since in order to switch the optical signal transmission requires a control of the routing of the optical transmission, an operational characteristic of wavelength selection alone is not sufficient to build an optical switch.

Therefore, a need still exists in the art to provide an innovative method for constructing MEMS-actuated highly integrated wavelength intelligent switches to add wavelength intelligence to the optical switches. It is desirable that the improved optical switch is able to eliminate unbalanced power loss, simplify fabrication and packaging processes, reduce the insertion loss and power consumption, and further improve the reliability of optical switches.

SUMMARY OF THE INVENTION

Briefly, the present invention discloses a method for constructing a MEMS-actuated waveguide grating-based wavelength selective switch. In one embodiment, the switch is fabricated on a silicon substrate. The switching action is based on electrostatic bending of a part of waveguide with integrated Bragg gratings built in its cladding layer. The waveguide with integrated Bragg gratings, defined as "Bridge Waveguide", functioning as a switching element. When the bridge waveguide is electro-statically bent close enough to an input waveguide, the wavelength, which meets the Bragg phase-matching condition, is coupled into the bridge waveguide. Through the bridge waveguide, the selected wavelength is then directed into a desired output waveguide.

For example, electrostatic bending of a waveguide with integrated Bragg grating can be implemented by simply applying a voltage between a silicon substrate and an electrode. This can greatly simplify the production of large-scale optical switches, comparing with the micro-mirror based MEMS approach.

The integrated Bragg grating is formed by physically corrugating a waveguide. Thus, it does not reply upon a photorefractive index change, which enables building Bragg gratings in material that are not photo-refractive and enhancing the grating strength. The integrated Bragg grating can be made smaller, and packed closer together than fiber-optic device. This opens the door for leveraging IC processing to fabricate the highly integrated optical switches.

In accordance with the invention, the switch matrix constructed by the method as that disclosed in this invention performs the de-multiplexing and re-multiplexing functions inherently. Therefore, in a preferred embodiment, no external de-multiplexers and complicated re-multiplexers are needed to form an optical switching functional block. The size and cost of the optical switches are significantly reduced as will be clearly taught by many embodiments according to the disclosures of this invention.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

FIG. 7C shows the grating element of a bridge-beam type switch is moved to "On" position when the voltage is turned on;

FIG. 8C shows the grating element of a cantilever-beam type switch is moved to "On" position when the voltage is turned on;

FIG. 9C shows the grating element of a dual cantilever-beam type switch is moved to "On" position when the voltage is turned on;

DETAILED DESCRIPTION OF THE PREFERRED EMBODIMENT

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention. Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
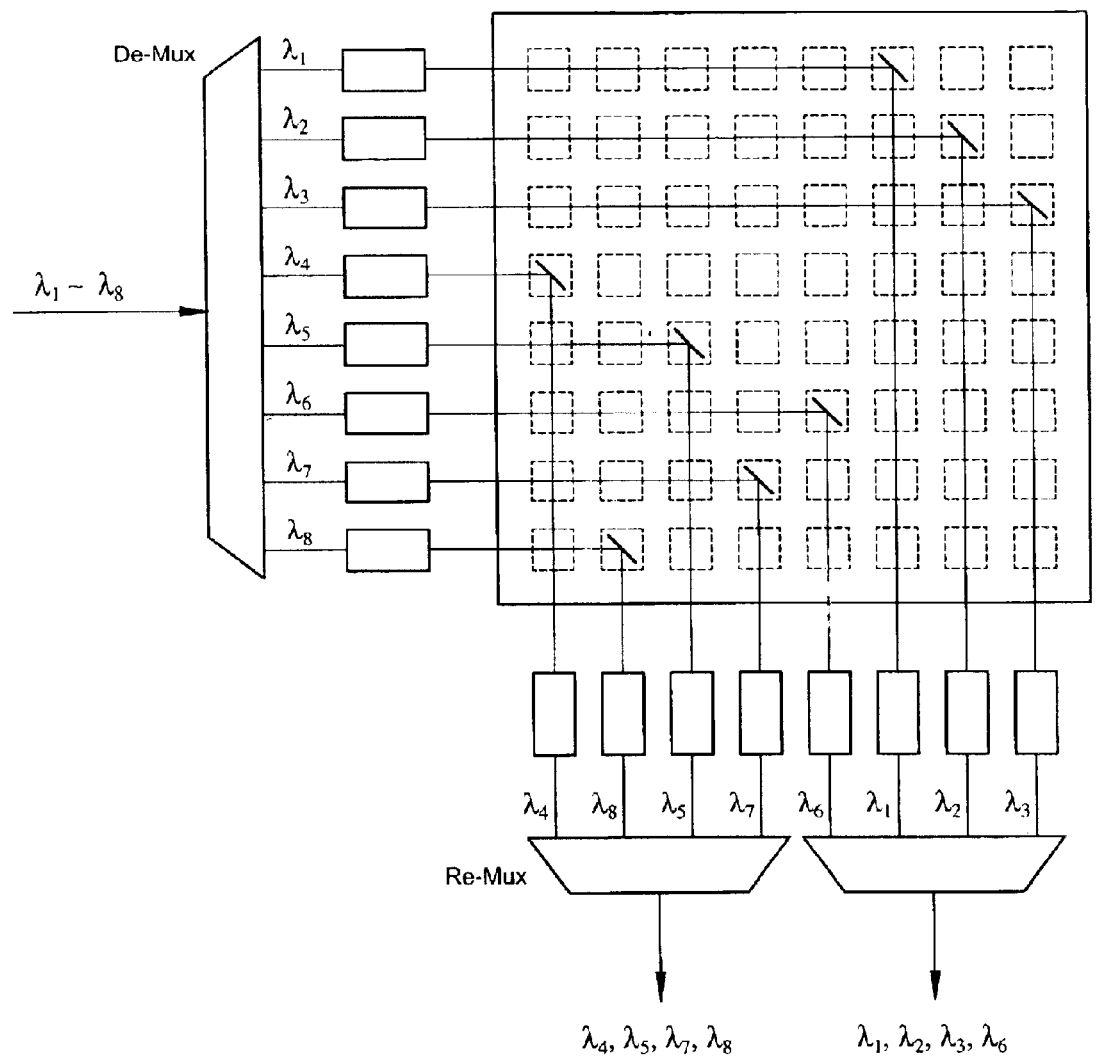
FIGS. 1A and 1B are two alternative schematic diagrams illustrating a conventional optical switch matrix that requires de-multiplex and re-multiplex device to carry out wavelength selective switching operations.
Figure 1B:
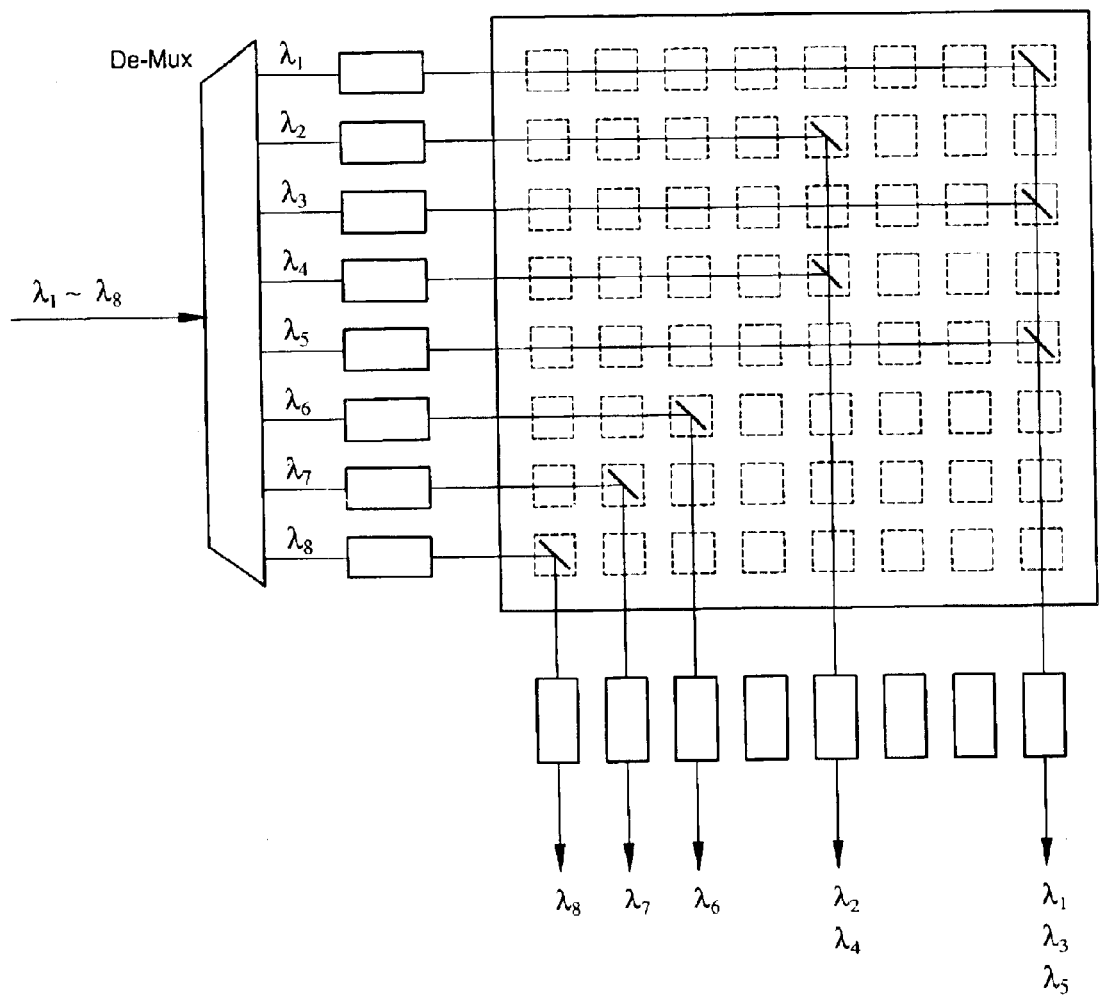
Figure 2A:
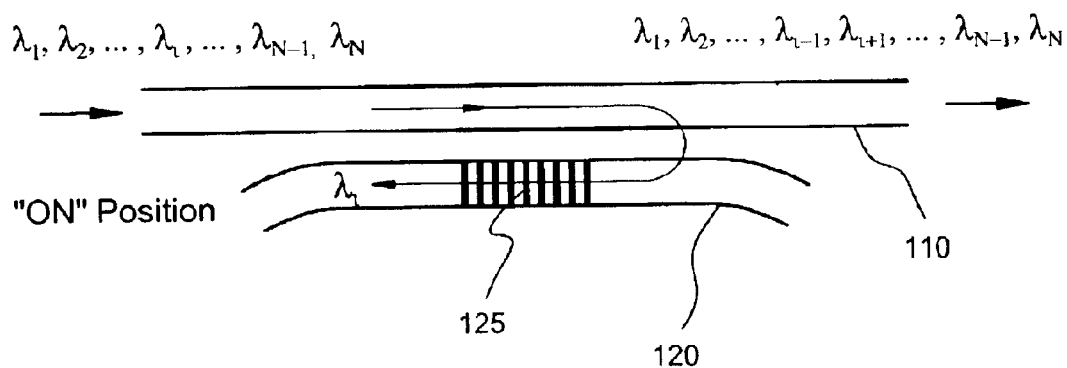
FIGS. 2A to 2F are schematic diagrams for showing the on/off switching functions of a wavelength selective bridge waveguide of this invention.
Figure 2B:
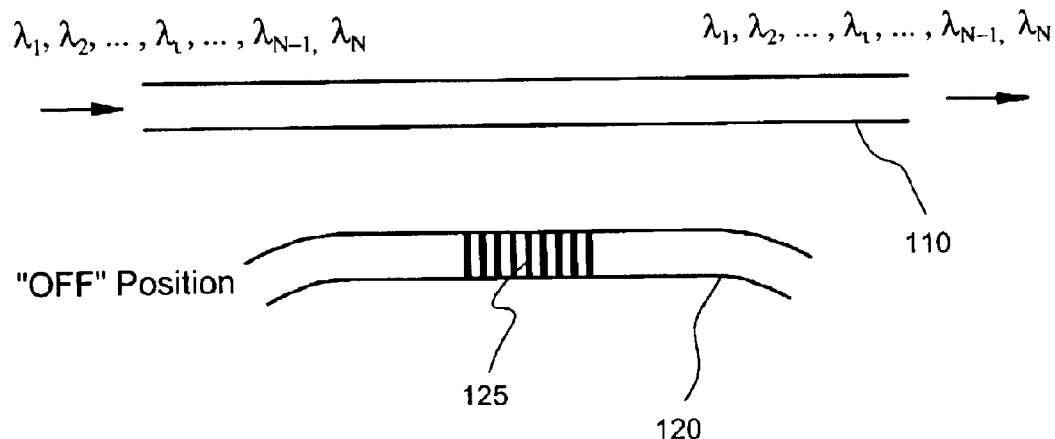

FIGS. 2A and 2B are schematic diagrams for showing the on and off states respectively of a wavelength-selective bridge waveguide 120 relative to a multi-channel bus waveguide 110. A multiplexed optical signal is transmitted in a bus waveguide 110 over N multiplexed wavelengths $\lambda_1$, $\lambda_2$, $\lambda_3$, ..., $\lambda_N$ where N is a positive integer. In FIG. 2A, the wavelength selective bridge waveguide 120 is moved to an on-position and coupling to the waveguide 110. An optical signal with a central wavelength $\lambda i$ particular to the Bragg gratings 125 disposed on the bridge waveguide 120 is guided into the wavelength selective bridge waveguide 120. The remainder optical signal of the wavelengths $\lambda_1, \lambda_2, \ldots, \lambda_{i-1}, \ldots, \lambda_N$ is not affected and continues to transmit over the waveguide 110. The Bragg gratings 125 have a specific pitch for reflecting the optical signal of the selected wavelength $\lambda_i$ onto the wavelength selective bridge waveguide. In FIG. 2B, the wavelength selective bridge waveguide is pulled off from the waveguide 110 to a "bridge-off" position. There is no "detoured signal" entering into the bridge waveguide. The entire multiplexed signal over wavelengths $\lambda_1, \lambda_2, \lambda_3, \ldots, \lambda_N$ continue to transmit on the bus waveguide 110.

Figure 2C:
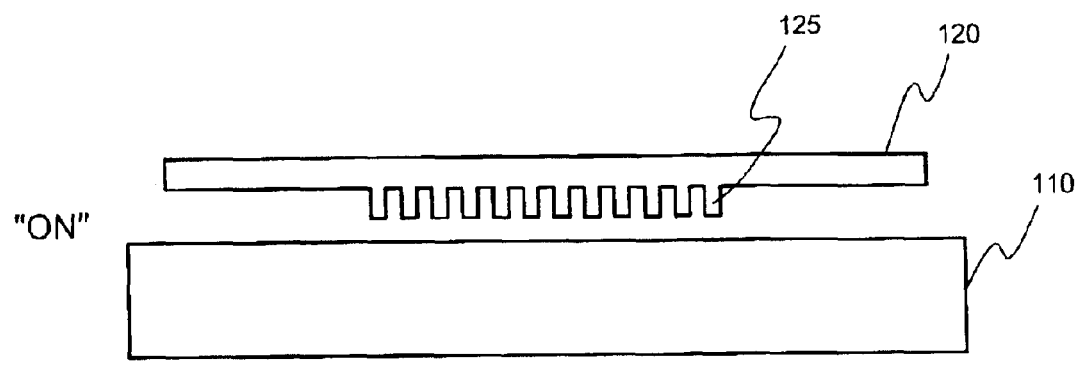
Figure 2D:
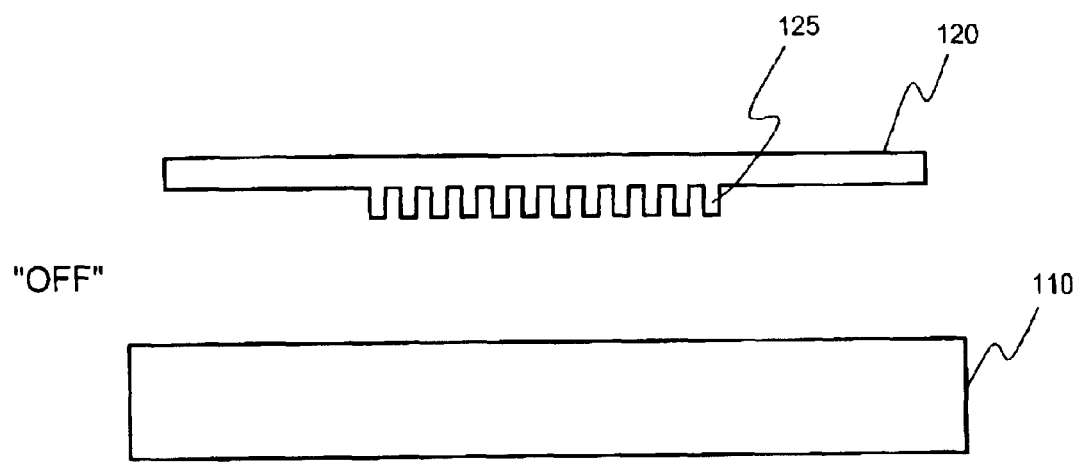
Figure 2E:
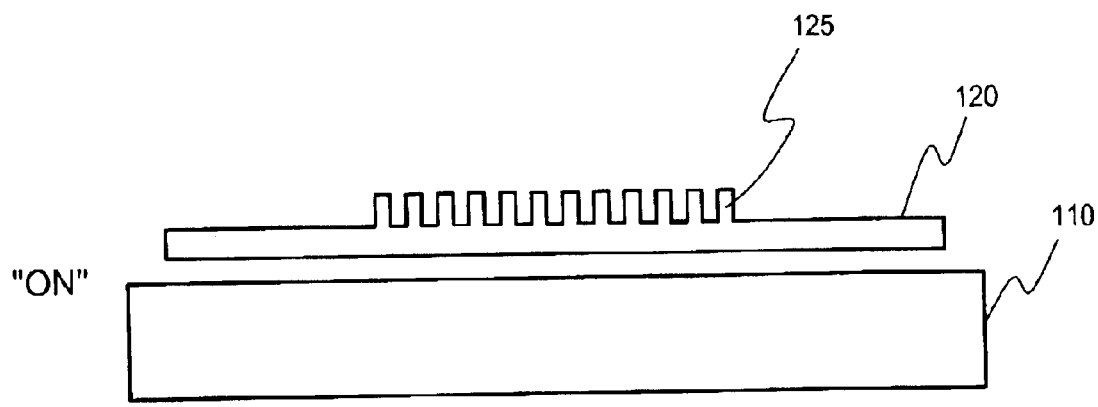
Figure 2F:
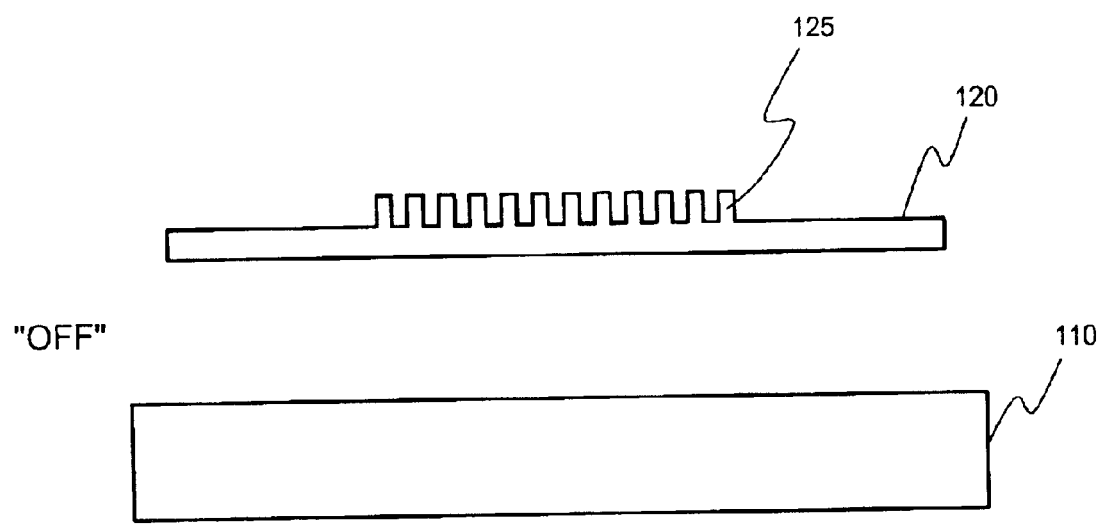

Referring to FIGS. 2C and 2D for the detail configuration of the Bragg gratings formed on the wavelength selective bridge waveguide 120. The pitch between the gratings 125 defines a selected wavelength that will be reflected onto the bridge waveguide 120 when the wavelength selective bridge waveguide is at an on-position coupled to the bus waveguide 110 as that shown in FIG. 2A. Furthermore, as that shown in FIGS. 2E and 2F, the Bragg gratings 125 are formed on a surface of the bridge waveguide 120 opposite the bus waveguide 110. Again, as the bridge waveguide 120 is moved to an "on" position coupled to the bus waveguide 110 in FIGS. 2C and 2E, an optical signal of a selected wavelength defined by the pitch between the Bragg gratings are coupled for transmitting over the bridge waveguide. The bridge waveguide 120 is moved to an "off" position in FIG. 2D and 2F, the bridge waveguide is completely decoupled and there is no "detoured signal traffic" enters into the bridge waveguide.

Figure 3A:
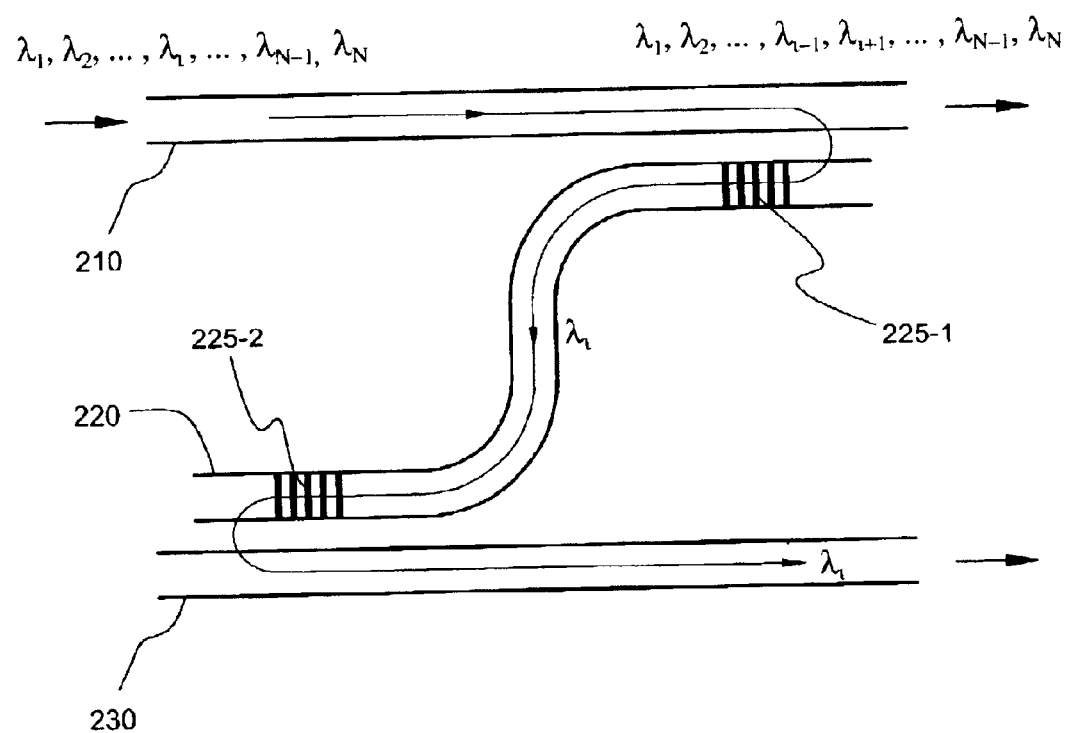
FIGS. 3A to 3C are cross sectional views for showing the coupling configurations of a wavelength-selective bridge waveguide coupled between a bus waveguide and an outbound waveguide.

FIG. 3A shows a wavelength selective bridge waveguide 220 is coupled between a bus waveguide 210 and a second waveguide 230. A multiplexed optical signal is transmitted in a bus waveguide 210 over N multiplexed wavelengths $\lambda_1$, $\lambda_2, \lambda_3, \ldots, \lambda_N$ where N is a positive integer. The wavelength selective bridge waveguide 220 has a first set of Bragg gratings disposed on a first "bridge on-ramp segment" 225-1 for coupling to the bus waveguide 210. An optical signal with a central wavelength $\lambda_1$ particular to the Bragg gratings 225 disposed on the bridge waveguide 220 is guided through the first bridge ramp segment 225-1 to be reflected into the wavelength selective bridge waveguide 220. The remainder optical signal of the wavelengths $\lambda_1, \lambda_2, \ldots, \lambda_{i-1}, \lambda_{i+1}, \ldots, \lambda_N$ is not affected and continues to transmit over the waveguide 210. The Bragg gratings 225 have a specific pitch for reflecting the optical signal of the selected wavelength $\lambda_i$ onto the wavelength selective bridge waveguide 220. The wavelength selective bridge waveguide 220 further has a second set of Bragg gratings as a bridge off-ramp segment 225-2 coupled to an outbound waveguide 230. The second set of Bragg gratings has a same pitch as the first set of Bragg gratings. The selected wavelength $\lambda_i$ is guided through the bridge off-ramp segment 225-2 to be reflected and coupled into the outbound waveguide 230. The bridge off-ramp segment 225-2 is disposed at a distance from the bridge on-ramp segment 225-1. The bridge waveguide 220 can be an optical fiber, waveguide or other optical transmission medium connected between the bridge on-ramp segment 225-1 and the bridge off-ramp segment 225-2.

Figure 3B:
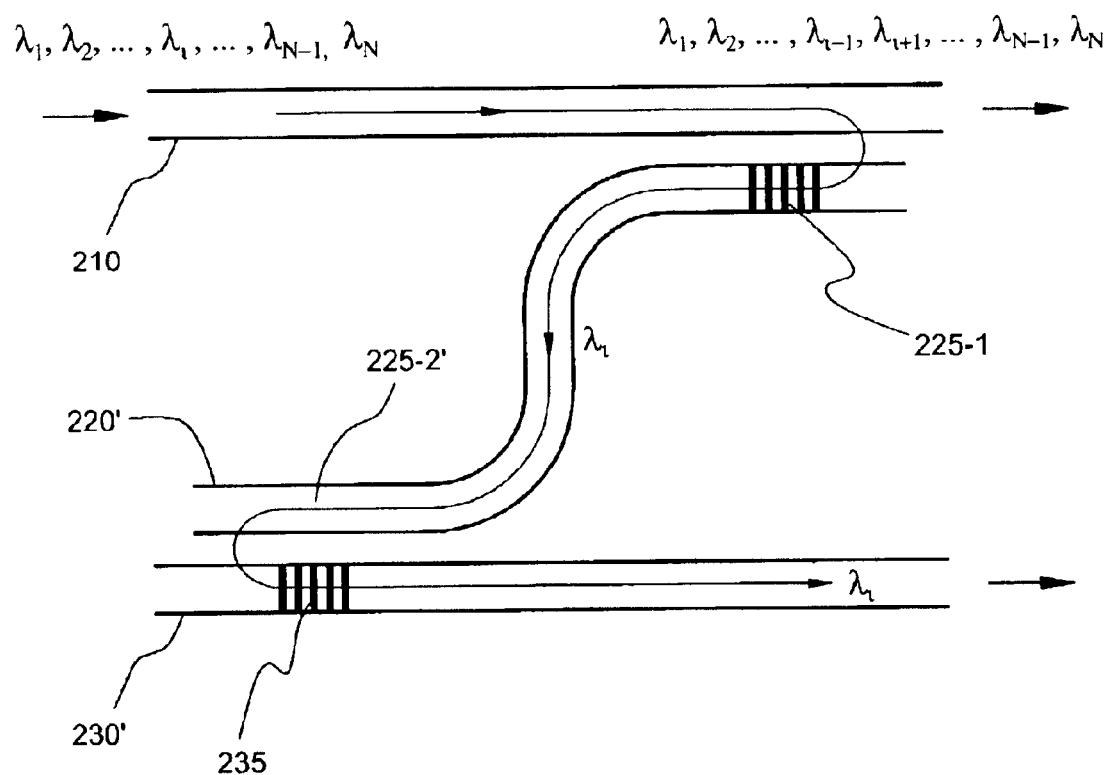

FIG. 3B shows another wavelength selective bridge waveguide 220' is coupled between a bus waveguide 210 and a second waveguide 230'. A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220' has a first set of Bragg gratings disposed on a first "bridge on-ramp segment" 225-1 for coupling to the bus waveguide 210. An optical signal with a central wavelength $\lambda_i$ particular to the Bragg gratings 225-1 disposed on the bridge waveguide 220' is guided through the first bridge ramp segment 225-1 to be reflected into the wavelength selective bridge waveguide 220'. The remainder optical signal of the wavelengths $\lambda 1, \lambda 2, \ldots, \lambda_{i-1}, \lambda_{i+1}, \ldots, \lambda_N$ is not affected and continues to transmit over the waveguide 210. The Bragg gratings 225-1 have a specific pitch for reflecting the optical signal of the selected wavelength $\lambda_i$ into the wavelength selective bridge waveguide 220'. The wavelength selective bridge waveguide 220' further has a bridge off-ramp segment 225-2' coupled to an outbound waveguide 230' near a section 235 of the outbound waveguide 230. The section 235 on the outbound waveguide 230' has a second set of Bragg gratings having a same pitch as the first set of Bragg gratings. The bridge off-ramp segment 225-2' is disposed at a distance from the bridge on-ramp segment 225-1. The bridge waveguide 220 can be an optical fiber, waveguide or other optical transmission medium connected between the bridge on-ramp segment 225-1 and the bridge off-ramp segment 225-2'.

Figure 3C:
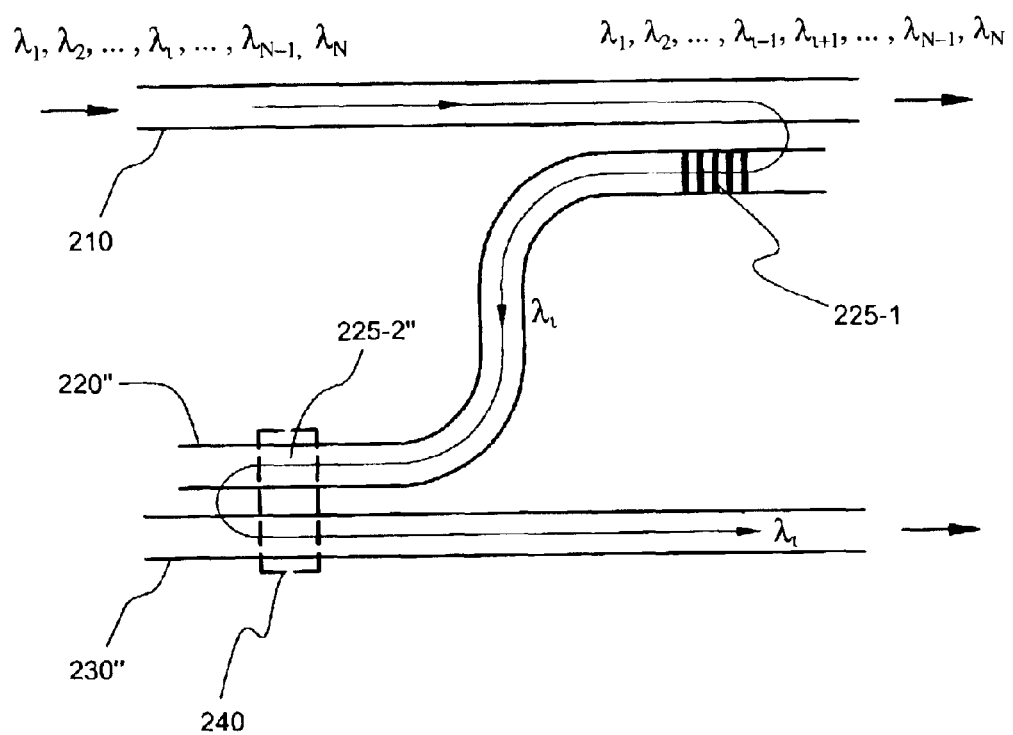

FIG. 3C shows a wavelength selective bridge waveguide 220" is coupled between a bus waveguide 210 and a second waveguide 230". A multiplexed optical signal is transmitted in a bus waveguide 210 over N multiplexed wavelengths $\lambda_1, \lambda_2, \lambda_3, \ldots, \lambda_N$ where N is a positive integer. The wavelength selective bridge waveguide 220" has a first set of Bragg gratings disposed on a first "bridge on-ramp segment" 225-1 for coupling to the bus waveguide 210. An optical signal with a central wavelength $\lambda_i$ particular to the Bragg gratings 225-1 disposed on the bridge waveguide 220" is guided through the first bridge ramp segment 225-1 to be reflected into the wavelength selective bridge waveguide 220". The remainder optical signal of the wavelengths $\lambda_1, \lambda_2, \lambda_3, \ldots, \lambda_{i-1}, \lambda_{i+1}, \ldots, \lambda_N$ is not affected and continues to transmit over the waveguide 210. The Bragg gratings 225-1 have a specific pitch for reflecting the optical signal of the selected wavelength $\lambda_i$ into the wavelength selective bridge waveguide 220". The wavelength selective bridge waveguide 220" further has a bridge off-ramp segment 225-2" coupled to an outbound waveguide 230" through a coupler 240. The bridge off-ramp segment 225-2" is disposed at a distance from the bridge on-ramp segment 225-1. The bridge waveguide 220 can be an optical fiber, waveguide or other optical transmission medium connected between the bridge on-ramp segment 225-1 and the bridge off-ramp segment 225-2".

According to FIGS. 3A to 3C this invention discloses a wavelength-selective bridge waveguide 220. The wavelength selective bridge waveguide includes a first waveguide-section and a second waveguide-section having a plurality Bragg gratings disposed thereon provided for wavelength selectively drawing an optical signal in from the first waveguide-section 225-1 and transmitting said optical signal out from the second waveguide-section 225-2. This invention further discloses a method for transmitting an optical signal through a wavelength-selective bridge waveguide. The method includes a step of forming a plurality Bragg gratings on the wavelength-selective bridge waveguide 220 for wavelength selectively drawing an optical signal through the first waveguide-section 225-1 and transmitting said optical signal out from a second waveguide-section 225-2. This invention further discloses a wavelength-selective bridge 220 disposed between a first waveguide 210 and a second waveguide 230. The wavelength selective waveguide includes a plurality Bragg gratings 225-1 provided for wavelength selectively transmitting an optical signal of a central wavelength particular to said Bragg gratings from the first waveguide 210 to the second waveguide 230.

Figure 4A:
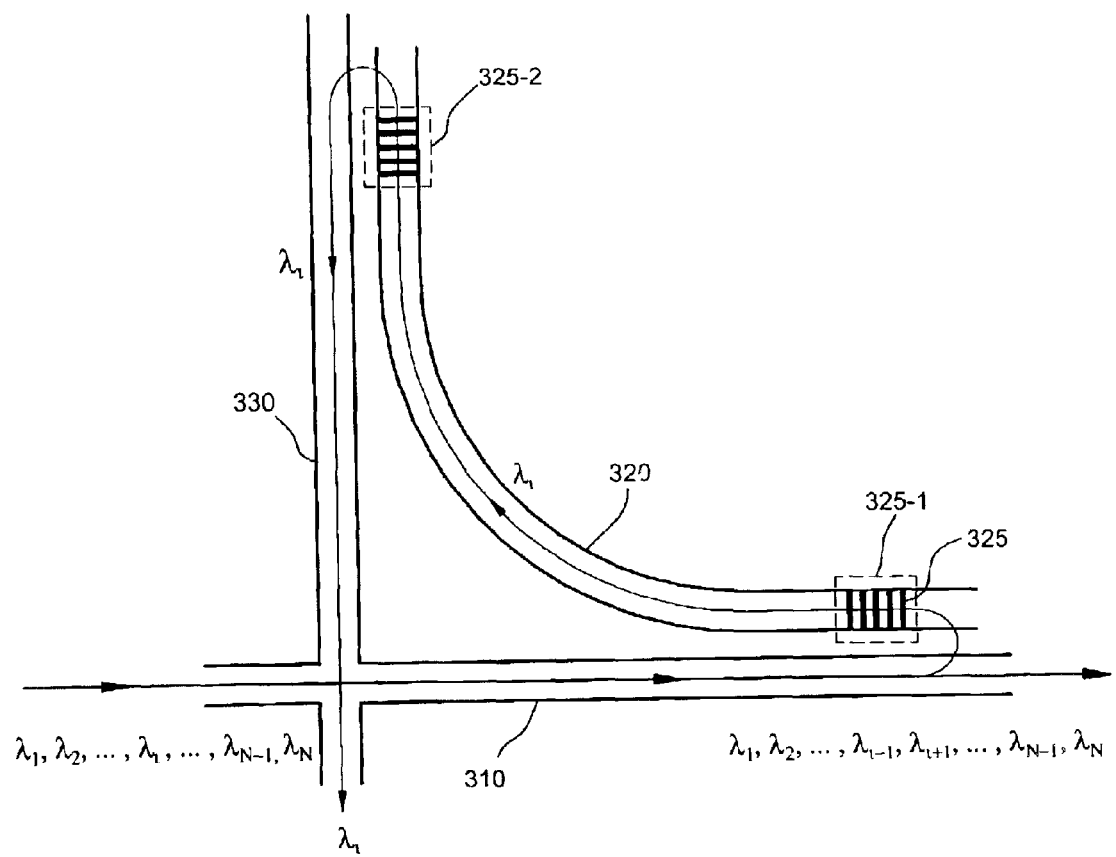
FIGS. 4A to 4E are functional diagrams for showing wavelength selective bridge waveguide coupled between the intersecting waveguides for switching and re-directing optical transmission of selected wavelength.

FIG. 4A shows a wavelength selective bridge waveguide 320 is coupled between a bus waveguide 310 and an intersecting waveguide 330. A multiplexed optical signal is transmitted in a bus waveguide 310 over N multiplexed wavelengths $\lambda_1, \lambda_2, \lambda_3, \ldots, \lambda_N$ where N is a positive integer. The wavelength selective bridge waveguide 320 has a first set of Bragg gratings disposed on a first "bridge on-ramp segment" 325-1 for coupling to the bus waveguide 310. An optical signal with a central wavelength $\lambda_i$ particular to the Bragg gratings 325 disposed on the bridge waveguide 320 is guided through the first bridge ramp segment 325-1 to be reflected into the wavelength selective bridge waveguide 320. The remainder optical signal of the wavelengths $\lambda_1, \lambda_2, \ldots, \lambda_{i-1}, \lambda_{i+1}, \ldots, \lambda_N$ is not affected and continues to transmit over the waveguide 310. The Bragg gratings 325 have a specific pitch for reflecting the optical signal of the selected wavelength $\lambda_i$ into the wavelength selective bridge waveguide 320. The wavelength selective bridge waveguide 320 further has a second set of Bragg gratings 325 as a bridge off-ramp segment 325-2 coupled to an outbound waveguide 330. The bridge off-ramp segment 325-2 is disposed at a distance from the bridge on-ramp segment 325-1. The bridge waveguide 320 can be an optical fiber, waveguide or other optical transmission medium connected between the bridge on-ramp segment and the bridge off-ramp segment 325-2.

Figure 4B:
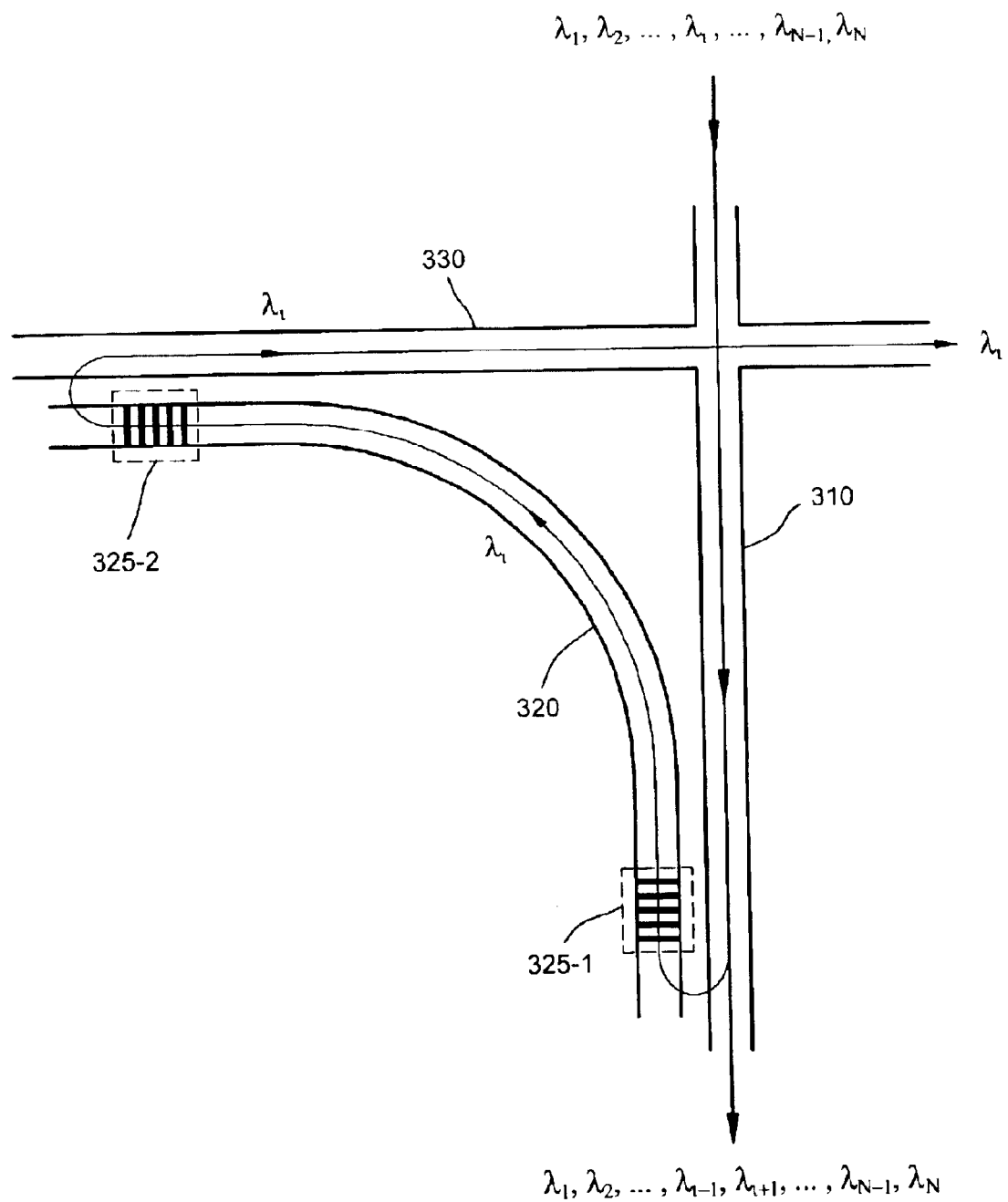
Figure 4C:
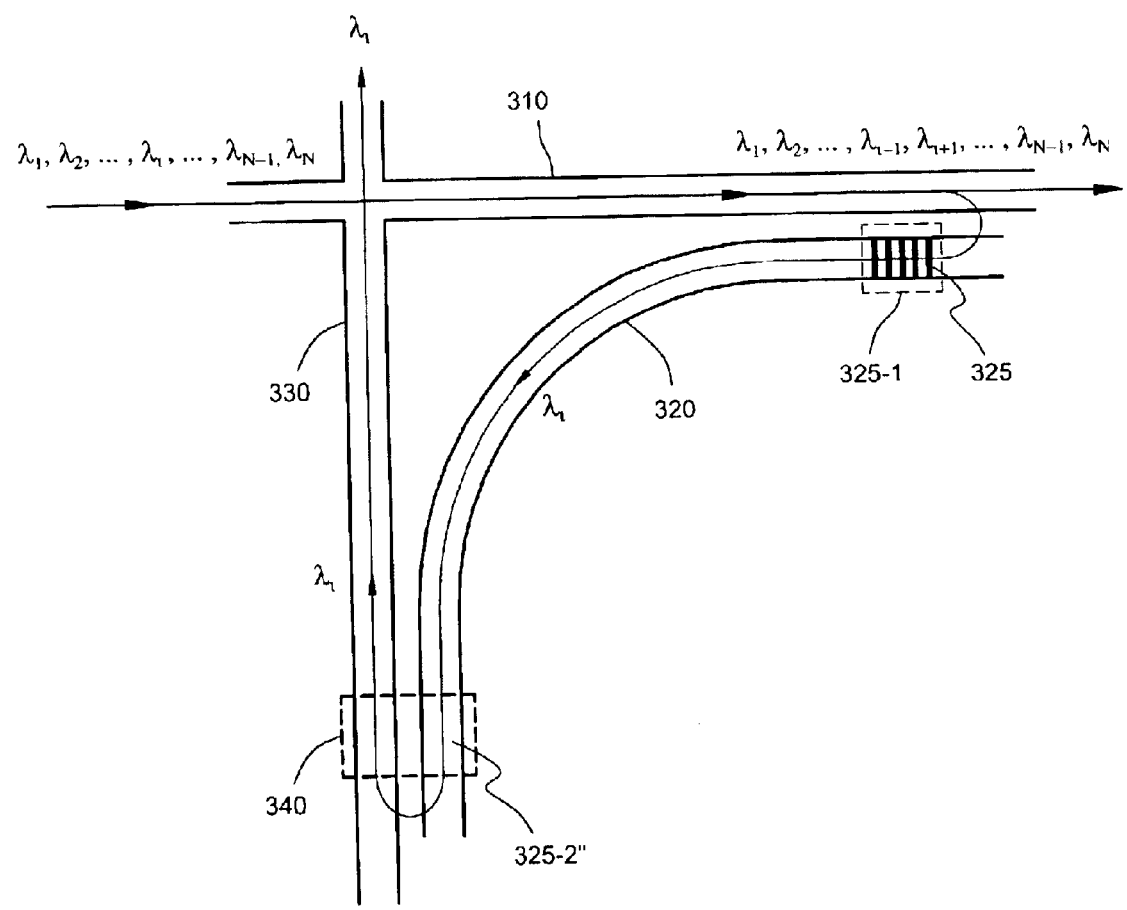
Figure 4D:
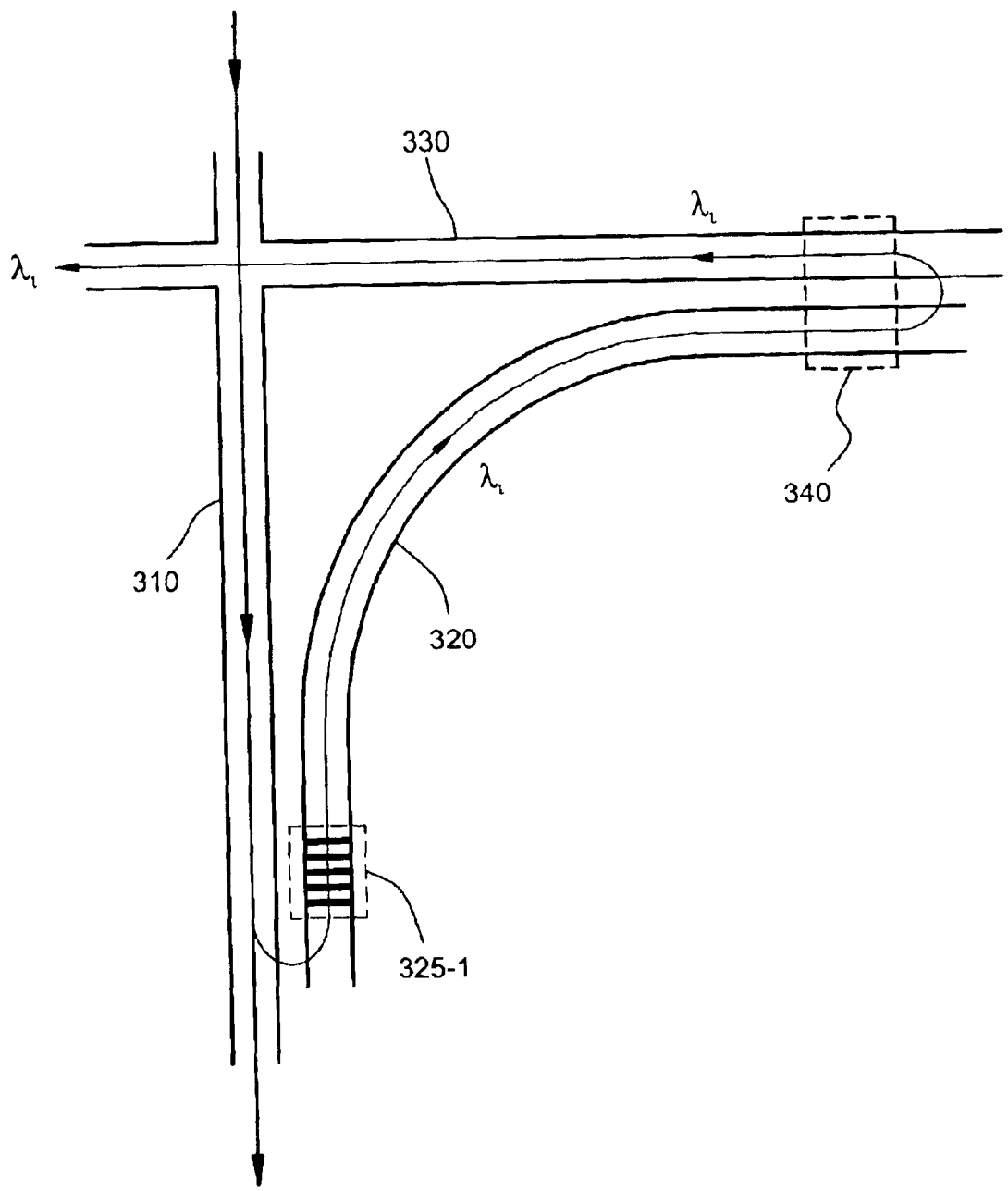

FIG. 4B is another preferred embodiment similar to that shown in FIG. 4A with the bus waveguide 310 disposed in a vertical direction and an interesting outbound waveguide 330 disposed along a horizontal direction. FIG. 4C is another preferred embodiment similar to that shown in FIG. 4A with the wavelength selective bridge waveguide 320 coupled to the outbound waveguide 330 through a coupler 340 near the bridge off-ramp segment 325-2" of the wavelength selective bridge waveguide. FIG. 4D is another preferred embodiment similar to that shown in FIG. 4C except that the bus waveguide 310 is disposed along a vertical direction and an outbound waveguide 330 is disposed along a horizontal direction.

Figure 4E:
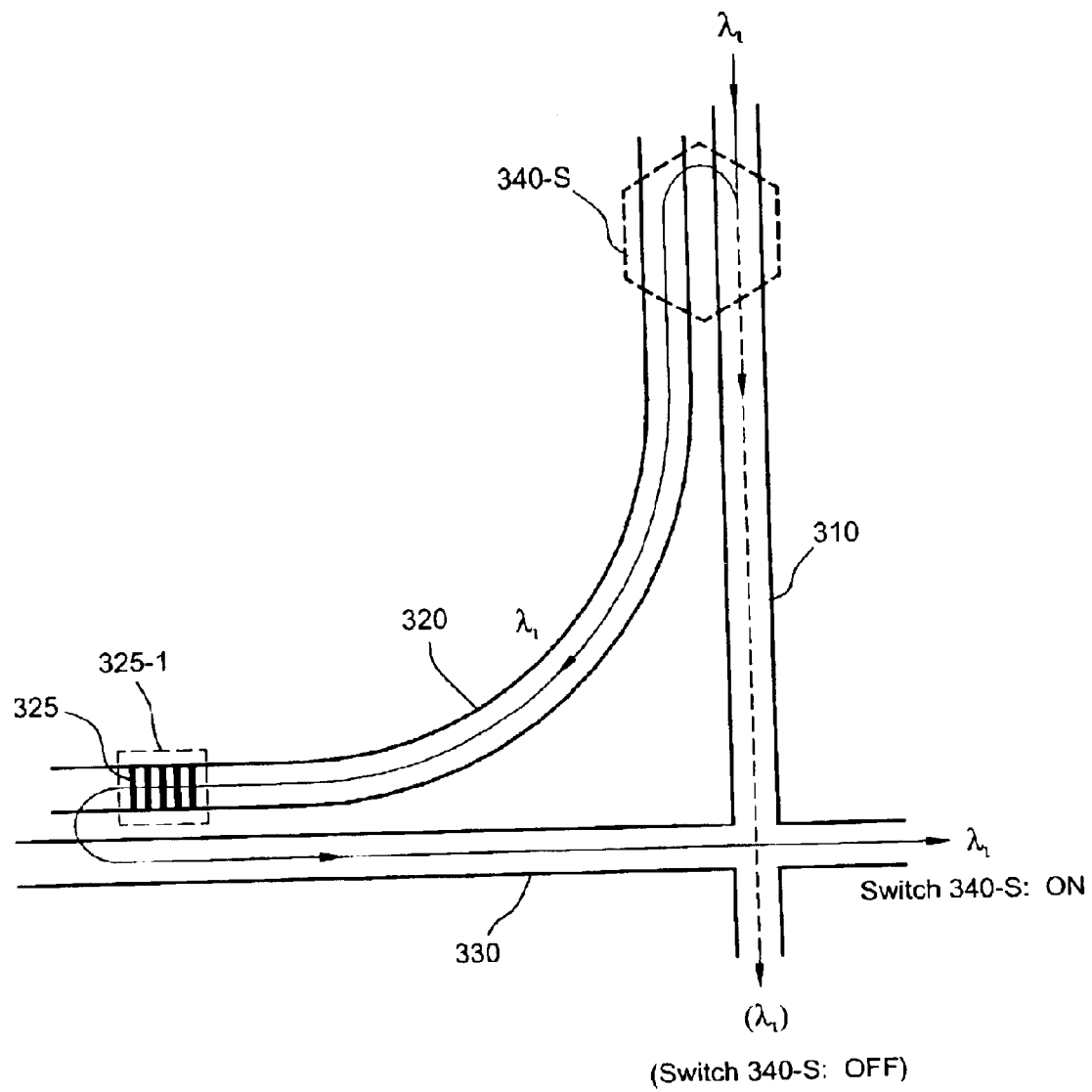

FIG. 4E shows a different embodiment of this invention with a wavelength selective bridge waveguide 320 is coupled between a bus waveguide 310 and an intersecting waveguide 330. An optical signal $\lambda_i$ is transmitted in a bus waveguide 310. The wavelength selective bridge waveguide 320 has a first end coupled to the bus waveguide 310 via an optical switch 340-S. The optical switch 340-S is controlled to transmit the optical signal to continue along the bus waveguide 310 or to switch the optical signal to transmit to the bridge waveguide 320. The bridge waveguide 320 has a second end 325-1 that has a plurality of Bragg gratings 325 coupled to an intersecting waveguide 330. The Bragg gratings 325 are coupled to the intersecting waveguide 330 for wavelength selectively projecting an optical signal with wavelength $\lambda_i$ as an output optical signal from the intersecting waveguide 330. The optical switch 340-S disposed on the first end of the bridge waveguide 320 for coupling to the bus waveguide 310 can be a thermal, mechanical, electro-optical, micro electromechanical system (MEMS), liquid crystal, etc.

According to FIGS. 4A to 4E this invention discloses a wavelength-selective bridge 320 disposed on an intersection between a first waveguide 310 and an intersecting waveguide 330. The wavelength selective bridge waveguide 320 includes a plurality Bragg gratings 325 provided for wavelength selectively transmitting an optical signal of a central wavelength particular to the Bragg gratings from the first waveguide 310 to the intersecting waveguide 330. In a preferred embodiment, the Bragg gratings 325 coupled to the first waveguide and the second waveguide. In another preferred embodiment, the Bragg gratings 325 of the wavelength-selective bridge 320 disposed near the first waveguide 310 and the wavelength-selective bridge 320 is coupled to the second waveguide 330. In another preferred embodiment, the wavelength selective waveguide is further coupled to the second waveguide 330 by using an optical coupler 340. In a preferred embodiment, the Bragg gratings 325 constituted a set of movable Bragg gratings for on-off movable to and from the first waveguide 310.

Figure 5A:
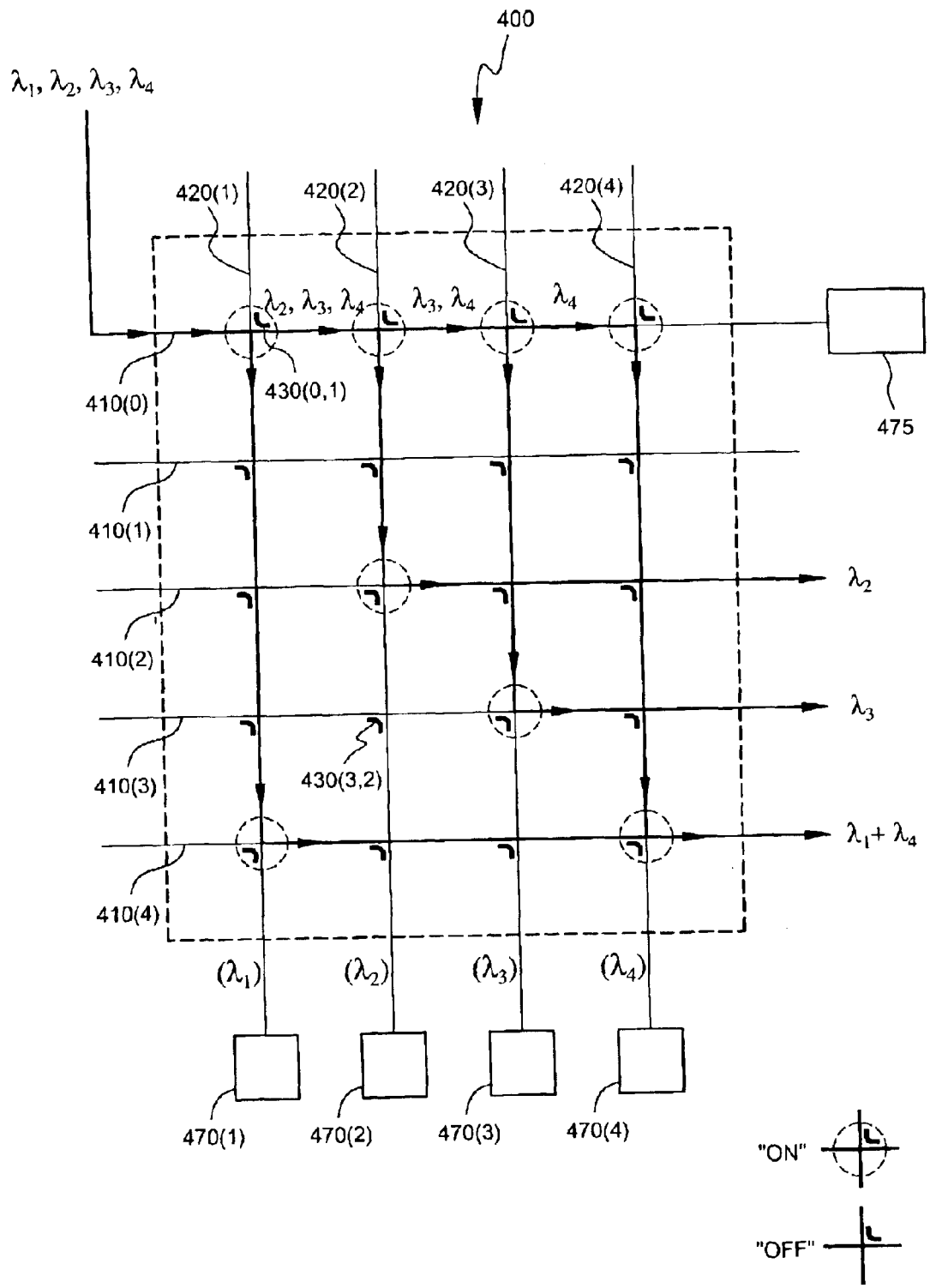
FIGS. 5A, 5B and 6 are schematic diagrams for showing the wavelength selective switch matrix systems implemented with wavelength selective bridge waveguides of this invention.

Referring to FIG. 5A for a two-dimensional wavelength selective switching system 400 of this invention. An exemplary 4×4 switch is shown for the purpose of describing the wavelength-selective switching operations and a basic configuration. However, it can be appreciated that the switch may be made to any arbitrary size as required by particular system requirements. The optical signal switching system 400 includes a two dimensional array of waveguides shown as horizontal waveguides 410(i) where i=0, 1, 2, 3, and 4 and vertical waveguides 420(j) where j=1, 2, 3, and 4. The horizontal waveguide 410(0) is an input waveguide for receiving an input optical signal that includes four multiplexed wavelengths $\lambda_1, \lambda_2, \lambda_3$, and $\lambda_4$. There are no requirements to implement external de-multiplexer to demultiplex the multiplexed optical signals. The horizontal waveguides 410(i) and the vertical waveguides intersect each other to form a plurality of wavelength selective switching intersections disposed with a wavelength selective grating-based switch 430(i, j) where i=0, 1, 2, 3, and 4, and j=1, 2, 3, and 4. A wavelength selective bridge waveguide 430(i, j) is disposed on each of the switching intersections between a horizontal and vertical waveguides 410(i) and 420(j). The function of the wavelength selective bridge waveguide is accomplished by using a Bragg grating-based wavelength coupling between two waveguides as described above.

Referring to FIG. 5A again where the input waveguide 410(0) receives a multiple-channel optical signal represented by $\lambda_1, \lambda_2, \lambda_3$, and $\lambda_4$. The input optical signal is then wavelength selectively switched by a wavelength selective grating-based switch 430(0, j) to a vertical waveguide 420(j) each transmitting an optical signal of a specific wavelength $\lambda j$ where j=1, 2, 3, and 4. The wavelength selective grating-based switches 430(i, j) disposed on the intersections of waveguides 410(i) and 420(j) may be selectively activated. The method and configuration for activating the grating-based switches is described above by applying a wavelength selective bridge waveguide. The grating-based switches 430(i, j) are selectively activated to switch optical signals of particular wavelength or combination of wavelengths to output from each of the horizontal waveguides 410(i), where i=1, 2, 3, and 4 implemented as output waveguides. For example, FIG. 5A shows the grating-based switches 430(4, 1), 430(2,2) and 430(3, 3) and 430(4, 4) are activated. By activating these grating-based switches, the output signal on waveguide 410(2) has a signal with wavelength $\lambda_2$. The output signal on waveguide 410(3) has a signal with wavelength $\lambda_3$. The output signal on waveguide 410(4) has a signal with wavelength $\lambda_1$ and $\lambda_4$. An optical switch operator is provided great degree of flexibility to alternatively activate different combinations of grating-based switches to generate output signals of different combination of wavelengths without requiring a re-multiplexing (REMUX) process.

In addition to the flexibility of selectively switching the optical signals of different wavelengths through different combinations of output waveguides, the wavelength-selective optical switch 400 is further provided with optical ports for connecting to residual signal detectors 470(j) where j=1, 2, 3, 4. An optical port is also provided for connecting to residual input signal detector 475. As shown in FIG. 5A, the residual signal detectors are disposed at the terminations of the vertical waveguides 420(j) and at the termination of input horizontal waveguide 410(0). The residual signal detectors are typically employed for detecting the conditions of operation to determine the functionality of the switching operations and noise levels through the residual signals.

Figure 5B:
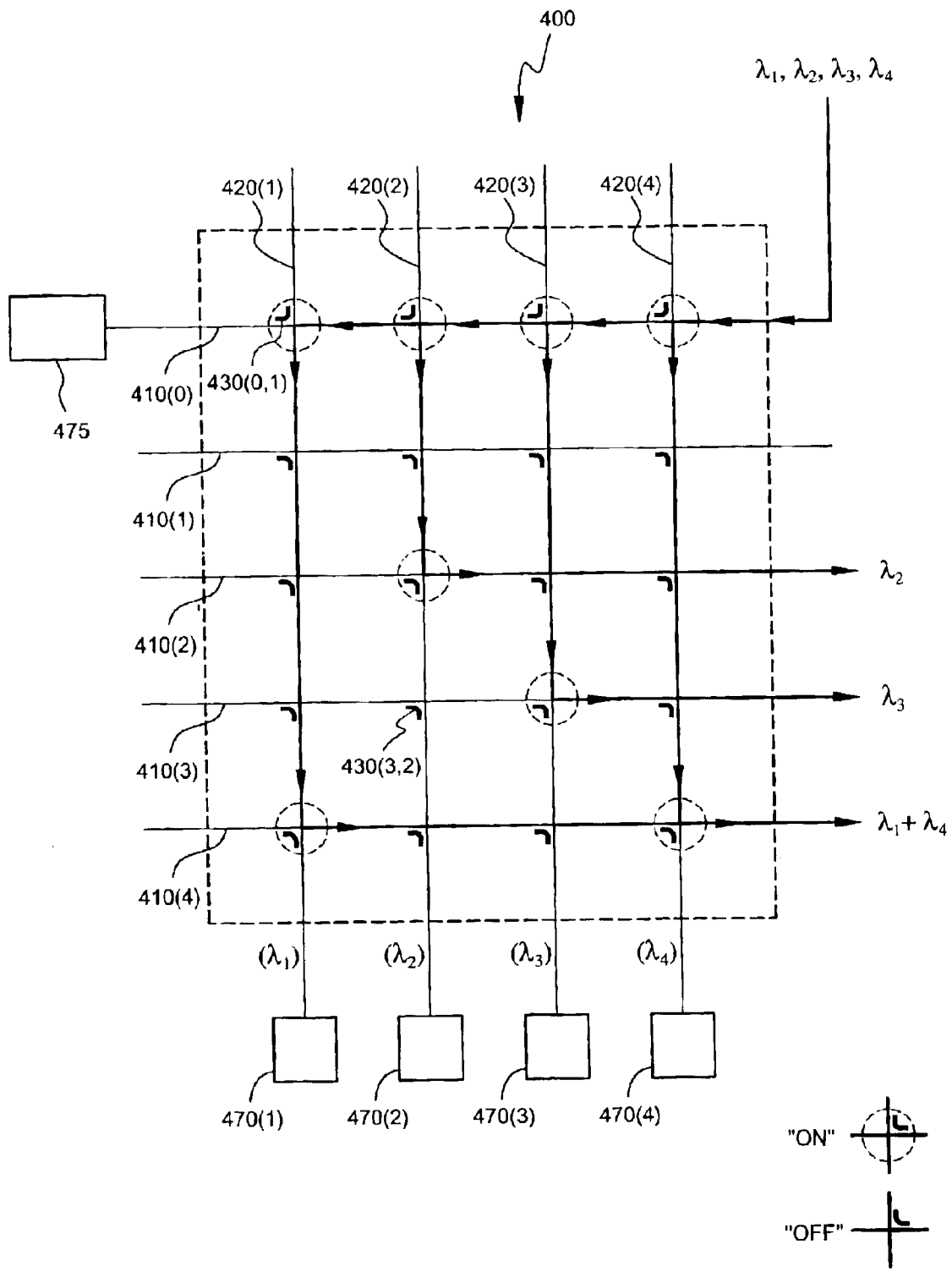

FIG. 5B shows a two-dimensional optical switching system similar to that described above for FIG. 5A. The only difference is a multiplexed signal represented by four wavelengths $\lambda_1, \lambda_2, \lambda_3$, and $\lambda_4$ is inputted into the input waveguide 410 from the right end. Then the input multiplexed signal is transmitted in the input waveguide 410 from the right end to the left end. The input wavelength selective bridge waveguides, e.g., the bridge waveguide 430 (0, j), where j=1, 2, 3, 4 are placed at a left-upper quadrant, in contrast to the left-lower quadrant shown in FIG. 5A, for coupling and reflecting an optical signal of selective wavelength $\lambda j$ from the input waveguide into a corresponding intersecting waveguide 420(j) where j=1, 2, 3, 4. Each of these optical signals projected to the intersecting waveguides 420(j) is then wavelength selectively reflected by an actuated wavelength selective bridge waveguide 430 (i, j), e.g., 430(4,1), 430((2,2), 430(3, 3) and 430(4,4), to an output waveguide 410(i), where i=2, 3, 4.

Figure 6:
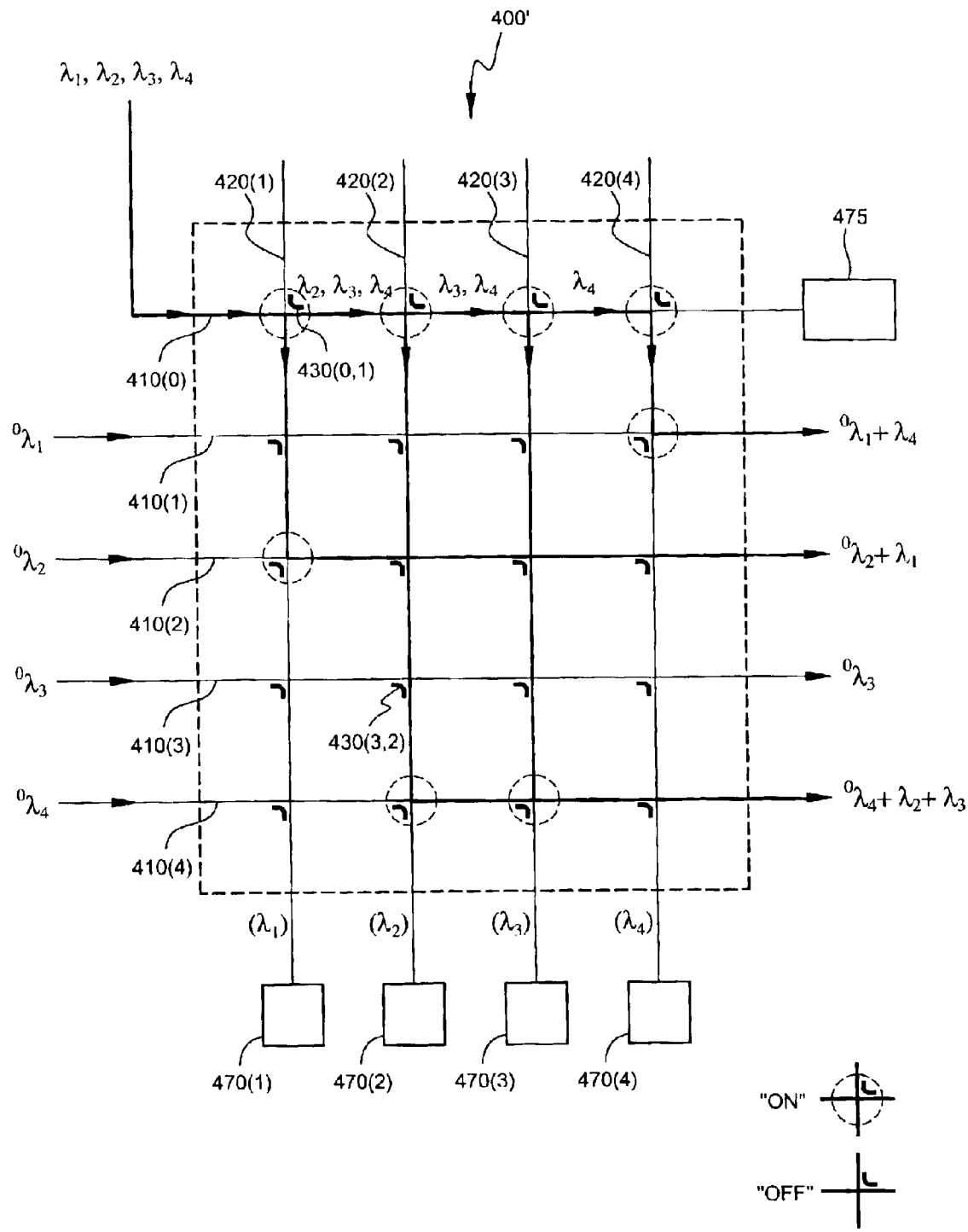

FIG. 6 is schematic diagram of another preferred embodiment for showing the functions of a two-dimensional wavelength selective switching system 400' of this invention. Similar to FIG. 5A, an exemplary 4×4 switch is shown for the purpose of describing the wavelength-selective switching operations and a basic configuration. The optical signal switching system 400' includes a two dimensional array of waveguides shown as horizontal waveguides 410(i) where i=0, 1, 2, 3, and 4 and vertical waveguides 420(j) where j=1, 2, 3, and 4. The horizontal waveguide 410(0) is an input waveguide for receiving an input optical signal that includes four multiplexed wavelengths $\lambda_1, \lambda_2, \lambda_3$, and $\lambda_4$. In addition, each of the optical signals represented by four wavelengths $^0\lambda_1, ^0\lambda_2, ^0\lambda_3$, and $^0\lambda_4$ is inputted from a corresponding horizontal waveguides 410(i) where i=1, 2, 3, and 4. The horizontal waveguides 410(i) and the vertical waveguide 420(j) intersect each other to form a plurality of wavelength selective switching intersections disposed with a wavelength selective bridge waveguide 430(i, j) where i=0, 1, 2, 3, and 4, and j=1, 2, 3, and 4. The function of the wavelength selective bridge waveguide as that described above is controlled to dispose at an on position represented by a dotted circle and an off position without the dotted circle for each of the wavelength selective bridge waveguides. The two-dimensional switching system is controlled with an on/off combination of the wavelength selective bridge waveguides to transmit the optical signal $^0\lambda_1+\lambda_4$ through 410(1), $^0\lambda_2+\lambda_1$ through 410(2), $^0\lambda_3$ via 410(3), and $^0\lambda_4+\lambda_2+\lambda_3$ via 410(4).

According to FIGS. 5A to 6 and above descriptions, this invention discloses a wavelength-selective optical switching system. The switching system includes an input waveguide designated as waveguide WG(0), e.g., 410(0), for receiving a multiplexed optical signal comprising optical signals transmitted over a plurality of wavelength channels represented by $\lambda_1, \lambda_2, \lambda_3, \ldots, \lambda_N$, where N is a positive integer, wherein the input waveguide extending over a first direction. The switching system further includes a two dimensional waveguide array comprising a plurality of first direction waveguides WG(i), i=1, 2, 3, , M extending over the first direction substantially parallel to the input waveguide WG(0) where M is a positive integer and a plurality of second direction waveguides WG'(j), j=1, 2, 3, N, extending over a second direction substantially perpendicular to the first direction and intersecting with the input waveguide and each of the first direction waveguide WG(i), i=0, 1, 2, 3, , M, thus forming (M+1)×N intersections. The switching system further includes a plurality of wavelength selective grating-based switches SW(i, j) where i=0, 1, 2, 3, M and j=1, 2, 3, , N, each disposed on one of the (M+1)×N intersections for selectively transmitting an optical signal of wavelength $\lambda_j$ into a waveguide WG'(j) and for selectively transmitting an optical signal of a predefined combination of wavelengths into at least one of the waveguide WG(i) where i=1, 2, 3, M.

Figure 7A:
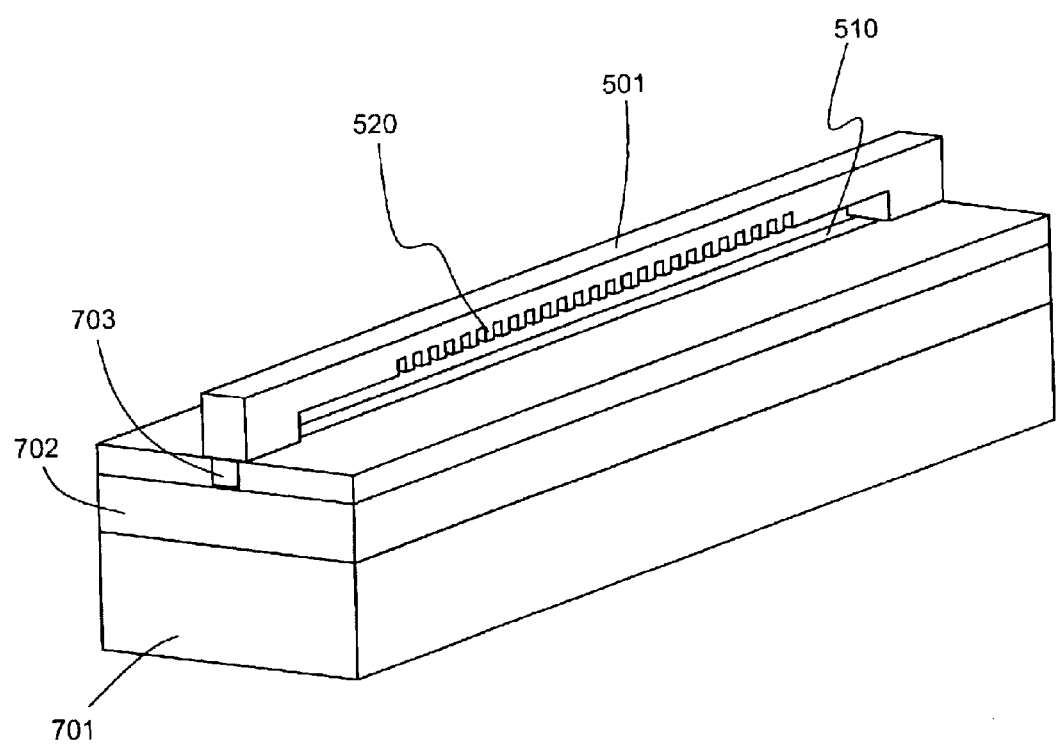
FIG. 7A illustrates the structure diagram of a bridge-beam type switch with integrated Bragg grating element.

FIG. 7A depicts an illustrative embodiment of bridge-beam type switchable grating structure with integrated Bragg grating elements. The structure is fabricated using MEMS technology and semiconductor processing described below. On the substrate 701, a cladding layer 702 is formed first. Then the core layer 703 is deposited and patterned to form waveguide core that is shown more clearly in the cross-sectional view FIG. 7B. The bridge beam 501 is a waveguide consisting of intergraded Bragg gratings 520 and an embedded electrode. When this waveguide, called bridge waveguide, is electro-statically bent close enough to an input waveguide 510, the wavelength that meets the Bragg phase-matching condition is coupled into the bridge waveguide. Through the bridge waveguide, the selected wavelength can then be directed into a desired output waveguide.

Figure 7B:
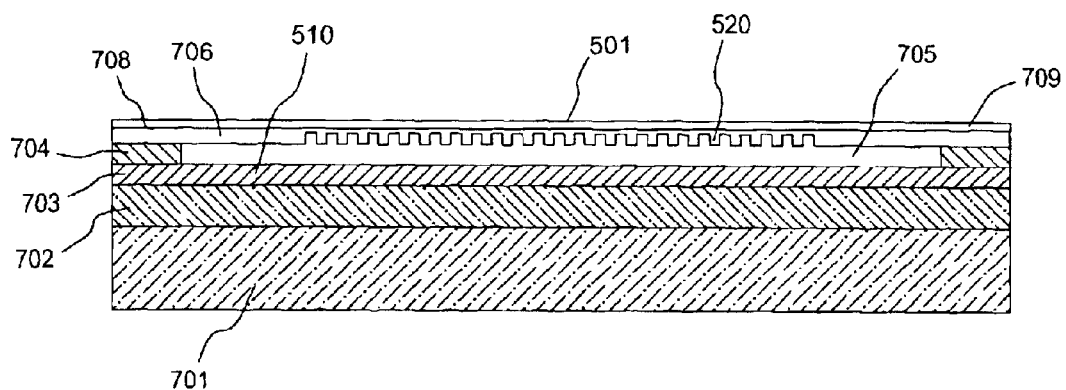
FIG. 7B illustrates the cross-sectional structure of a bridge-beam type switch in which the grating coupling is normally off.
Figure 7C:
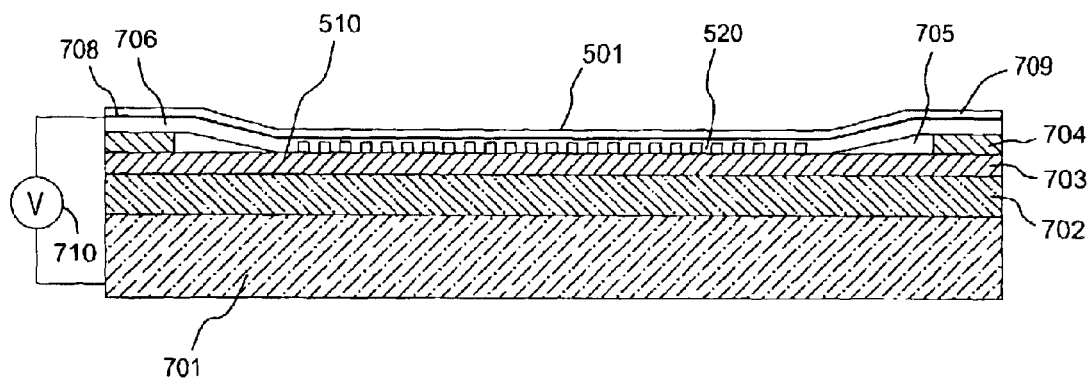

FIG. 7B shows the cross-sectional view of bridge-beam type switchable grating structure with integrated Bragg grating elements. After the cladding layer 702 and core layer 703 are deposited, a sacrificial layer is deposited after another cladding layer 704 is deposited and patterned. After the sacrificial layer is patterned and the grating grooves are etched on sacrificial layer, another cladding layer 706 is deposited. The electrode layer 708 and the insulation layer 709 are deposited subsequently. The etching process starts from layer 709 through into layer 704 after patterning. Finally the sacrificial layer is etched to form the air gap 705 between waveguide 510 and grating element 520. In an alternative way, the waveguide and the grating element can be fabricated on its own substrate first. Then they are aligned and bonded together to make the same structure shown in FIG. 7B. Due to the existence of air gap 705, the grating is off when the grating element is at normal position (no voltages applied). Referring to FIG. 7C, when an appropriate voltage 710 is applied between the electrode 708 and substrate 701, the grating element 520 is deflected toward input waveguide 510 by the electrostatic force. The grating is turned "on" when the grating element 520 moving close enough to input waveguide 510.

Figure 8A:
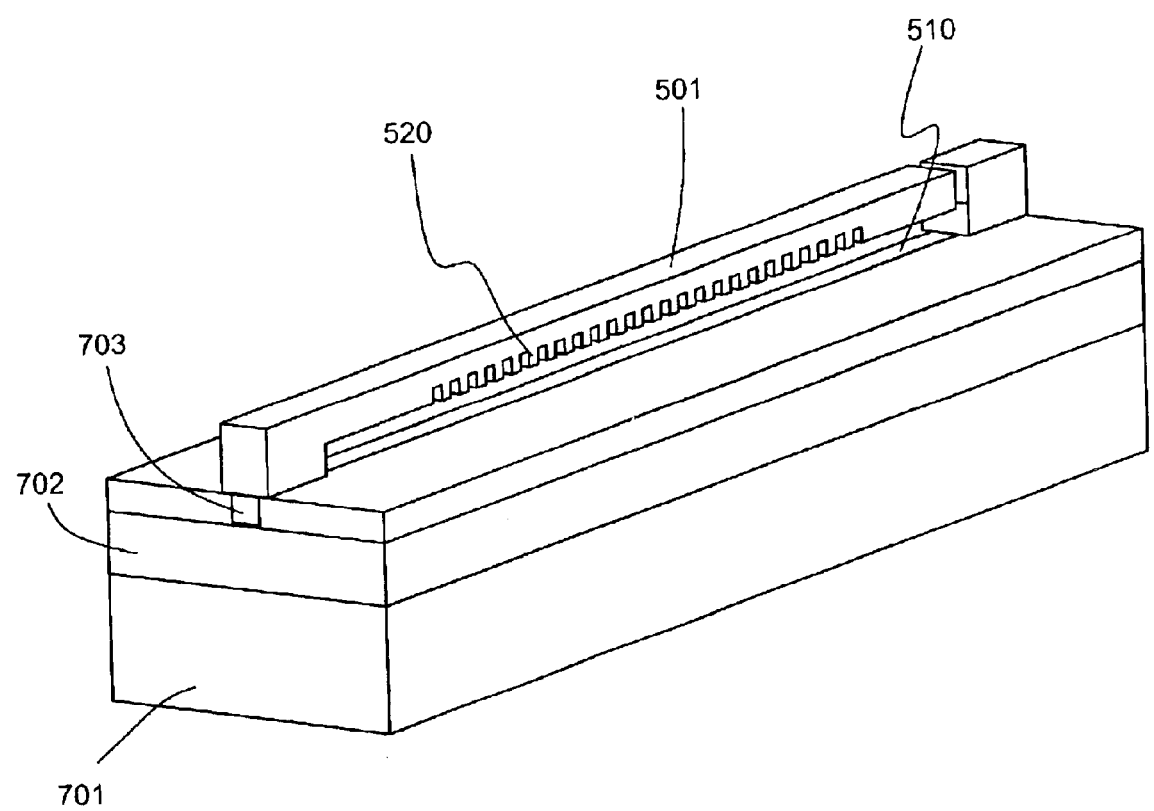
FIG. 8A illustrates the structure diagram of a cantilever-beam type switch with integrated Bragg grating element.
Figure 8B:
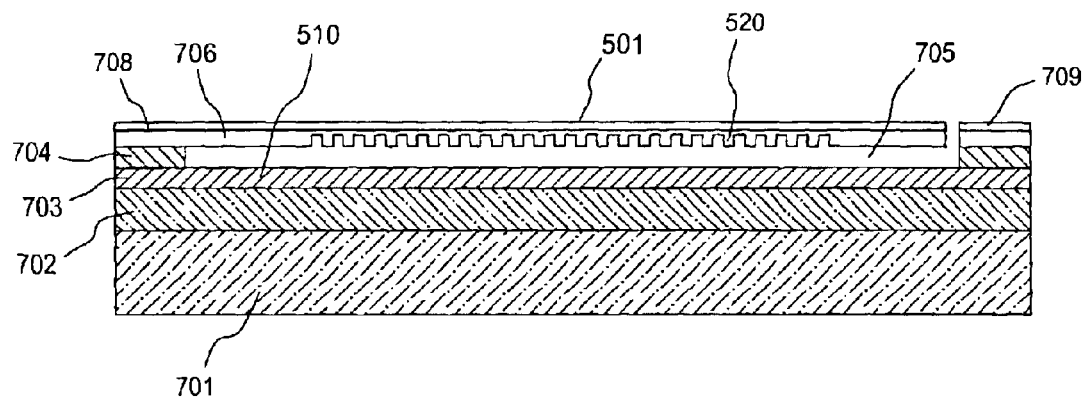
FIG. 8B illustrates the cross-sectional structure of a cantilever-beam type switch in which the grating coupling is normally off.
Figure 8C:
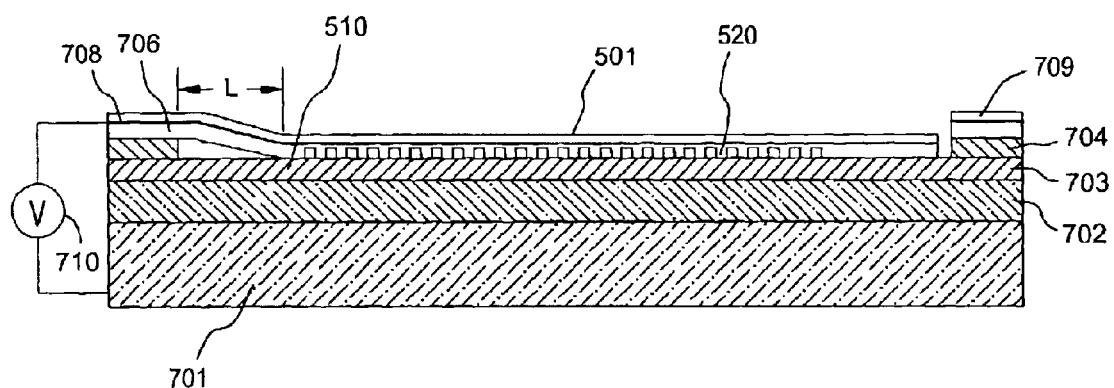

FIG. 8A depicts an illustrative embodiment of cantilever-beam type switchable grating structure with integrated Bragg grating elements. The structure is fabricated using similar MEMS technology and semiconductor processing described above. In this arrangement, the stress and strain in the grating segment 520 can be reduced greatly. Therefore, the lifetime of grating element can be improved. FIG. 8B sketches the cross-sectional structure of a cantilever-beam type switch. Referring to FIG. 8C, the cantilever beam 501 is deflected by the electrostatic force. Applying voltages 710 between substrate 701 and electrode 708 controls the electrostatic force applied to the cantilever beam 501. Therefore, by controlling the applying voltages 710 the wavelength-selective optical function can be activated through varying the degree of coupling between Bragg grating 520 and input waveguide 510.

Referring to FIG. 8C again, an adequate beam length L is required in order to deflect the beam 501 to certain displacement within the elastic range of the material. For example, a 500 um long cantilever Si beam with the section of 12 um×3 um can be easily deformed by 4 um at the tip of the beam. Another major advantage for the cantilever beam structure is that the movable beam 501 can be shorter and therefore reduce the size of the switch.

Figure 9A:
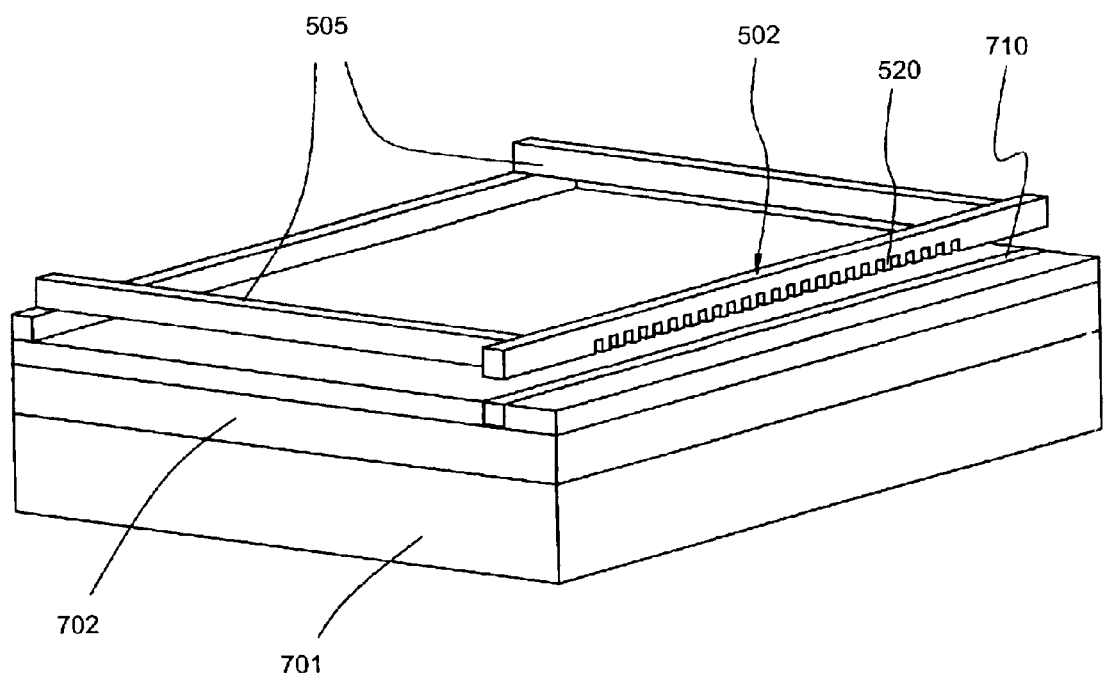
FIG. 9A illustrates the structure diagram of a dual cantilever-beam type switch with integrated Bragg grating element.
Figure 9B:
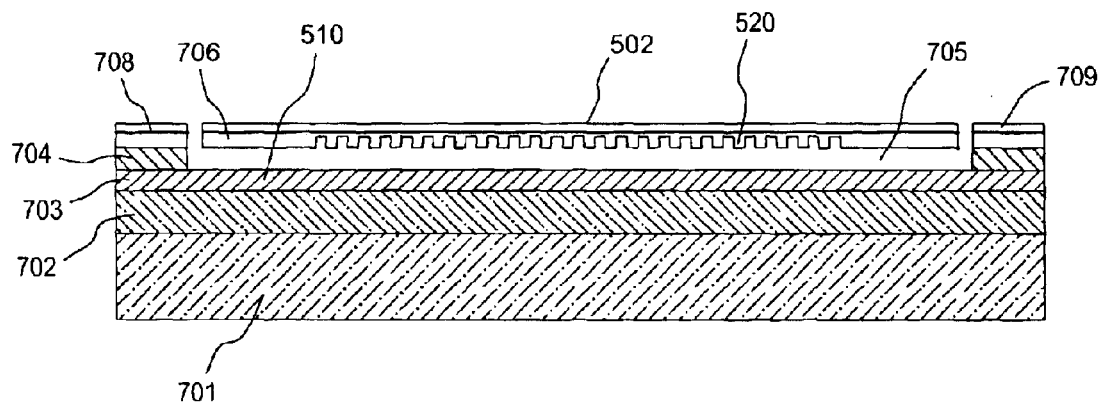
FIG. 9B illustrates the cross-sectional structure of a dual cantilever-beam type switch in which the grating coupling is normally off.
Figure 9C:
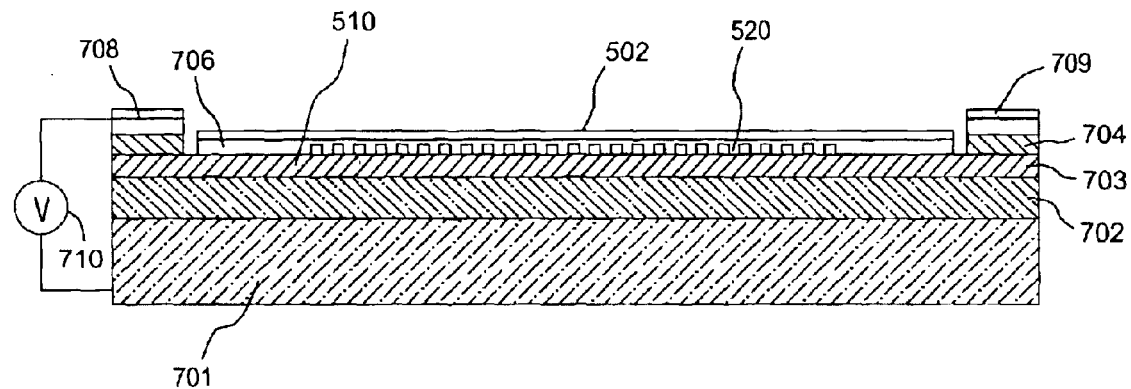

FIG. 9A illustrates the structure diagram of another embodiment of the inventions. This is a dual cantilever-beam type switch. In this structure the grating element is fabricated on a movable beam 502, which is supported by two cantilever beams 505. In this arrangement, the stress and strain in the grating segment can be eliminated almost completely if the electrode pattern is also located appropriately. Another advantage is that the material of cantilever beams 505 is not necessarily to be the same as the material of grating element 520. For instance, cantilever beams 505 can be made of metal to improve the elasticity of the beams. In addition, the anchor structure can be in different forms, e.g. MEMS springs or hinges. Therefore, the large displacement and smaller size of grating element is more achievable in this structure. FIG. 9B and 9C sketches the cross-sectional structure of a dual cantilever-beam type switch. Similar to the operations described above, the grating element 520 is moved towards the input waveguide 510 by applying voltages 710 to electrode 708 and substrate 701. The major difference is that the grating segment 520 is not bent during the operation.

Figure 10:
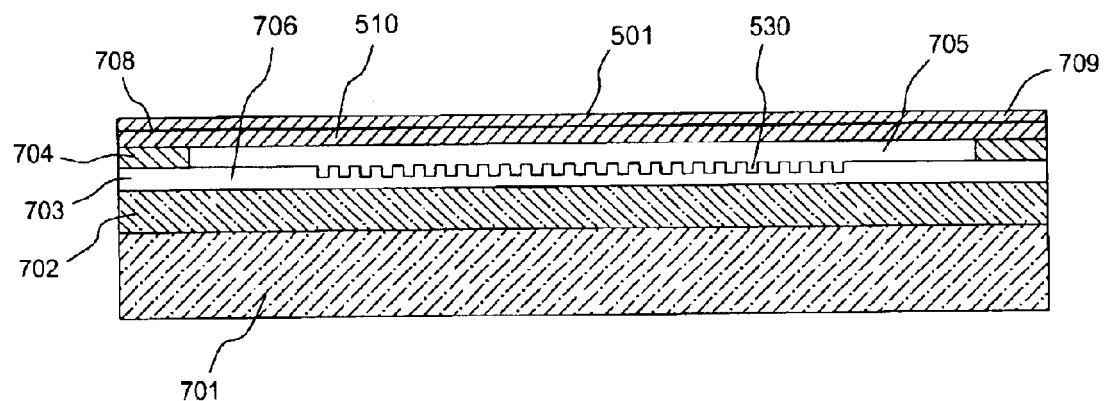
FIG. 10 illustrates the cross-sectional structures of another embodiment of the inventions. In the structure, the gratings are fabricated on the substrate, rather than on the movable beam.

FIG. 10 shows an alternate structure. In this structure the grating is located on the bottom side, or the surface side of the substrate. The structure can be fabricated by applying semiconductor processing technology to form the Bragg gratings 530 on the core layer 703 while positioning the movable beam 501 and the Bragg gratings 530 to have a small gap 705 from the waveguide 510. Similar to the operations described above, an electric conductive layer 708 is formed on the movable beam 501 for applying the voltage to assert an electrostatic force to bend the movable beam 501. The electrostatic force thus activates the movable switch by coupling a waveguide 706 to input waveguide 510. The Bragg gratings 530 thus carry out a wavelength-selective optical switch function.

Figure 11:
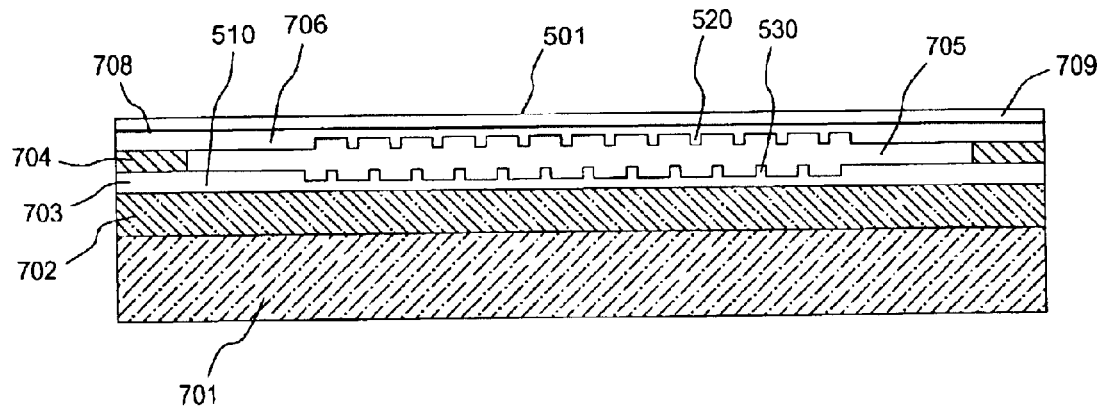
FIG. 11 illustrates the cross-sectional structures of another embodiment of the inventions. In the structure, the gratings are fabricated on both the substrate and the movable beam.

FIG. 11 is also an alternate structure of switchable gratings. In this structure the grating is located on both top and bottom sides. Similar semiconductor processing technology can be used to form the Bragg gratings 520 on the movable beam 501 and the Bragg gratings 530 on the waveguide 510. A small gap is formed between waveguides 510 and 706. An electric conductive layer 708 is also formed on the movable beam 501 for applying the voltage to assert an electrostatic force to bend the movable beam 501. Similar to the operations described above, the electrostatic force thus activates the switch by coupling the selected wavelength from input waveguide 510 to waveguide 706.

Figure 12:
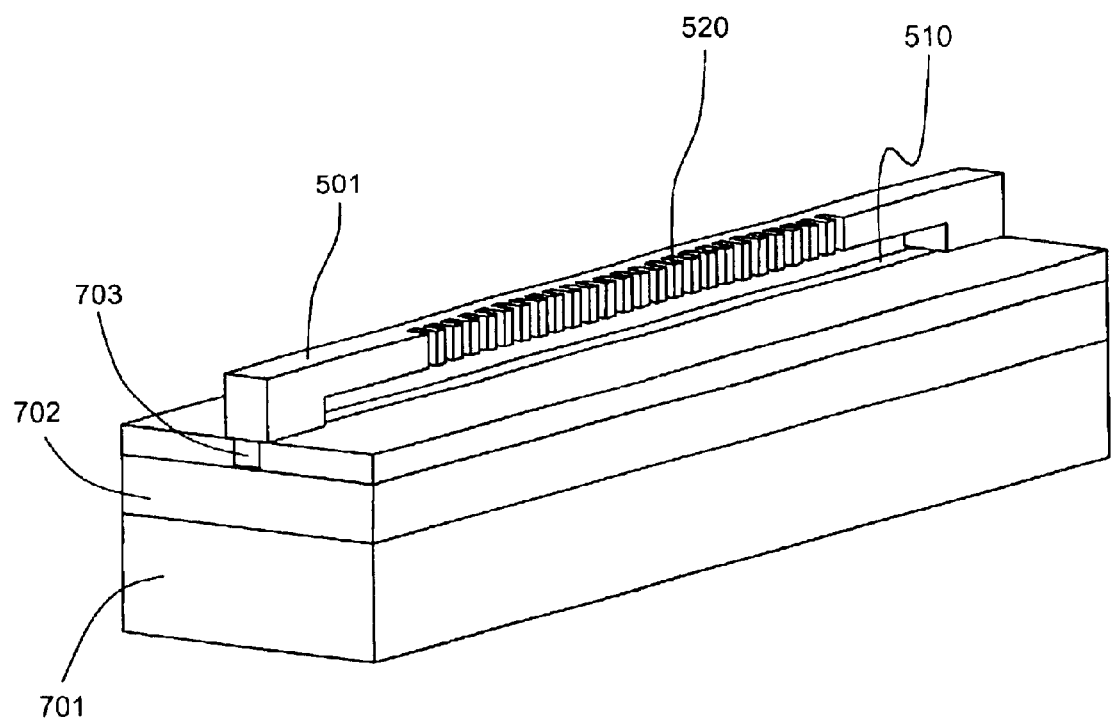
FIG. 12 illustrates the structure diagram of another embodiment of the inventions. In the structure, the gratings are fabricated on the horizontal sides of the movable beam.

In all the structures described above, the grating element is located faced up or down to the substrate. However, the grating element can also fabricated on the sides of the waveguide, as illustrated in FIG. 12. In this embodiment of the inventions, the gratings 520 are fabricated on the horizontal sides of the movable beam 501 and the rest of the structure are similar to those structure described above and all the wavelength-selective functions and operations are also similar to those described above. In addition, by rearranging the pattern of electrode, e.g. in FIG. 2E, the grating structure can also be made on the top side of the cantilever or bridge beams. This structure provides a greater cost advantage in manufacturing.

Figure 13A:
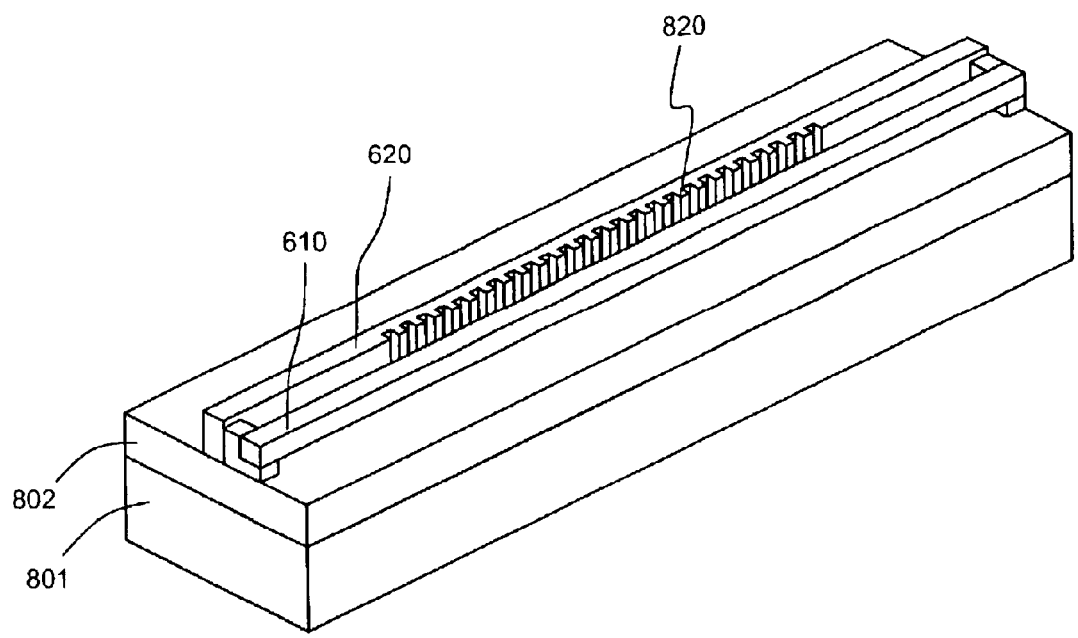
FIGS. 13A and 13B illustrate the structure diagrams of another embodiments of the inventions. In the structure configurations, the waveguides are both fabricated on the same surface of the substrate.
Figure 13B:
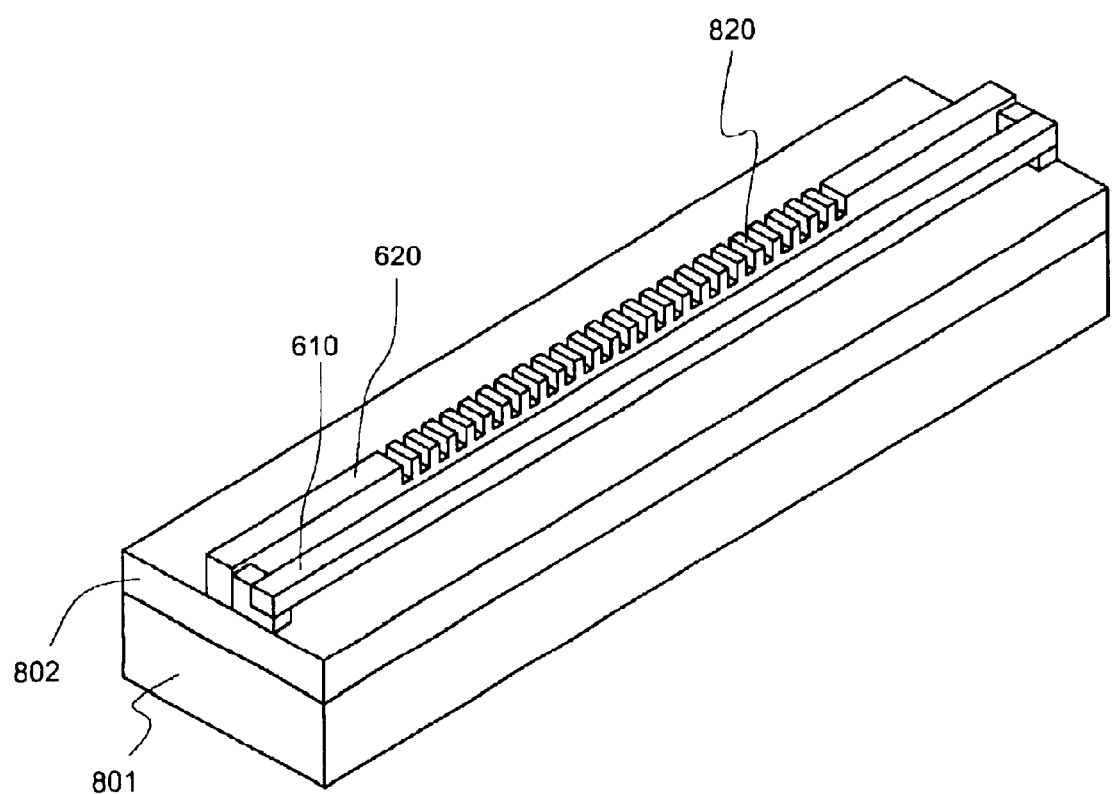

FIG. 13A shows another preferred structure of switchable gratings. Instead of arranging the coupling waveguides as several vertical layers supported on a semiconductor substrate as shown above, the coupling waveguides 610 and 620 are formed as planar array on a same cladding layer 802, supported on a semiconductor substrate 801. The movable waveguide 610 and coupling waveguide 620 have their own embedded electrodes, similar to those described above. Again, the Bragg gratings 820 can be formed on one or both of the waveguides 610 and 620 as described above. When electrostatic voltages are applied between these electrodes, movable waveguide 610 is moved towards waveguide 620 and thus activate the optical switch. FIG. 13B shows another structure with the gratings 820 facing upward. This structure extends the manufacturing flexibility.

According to above descriptions and drawings, this invention discloses an on/off switchable wavelength-selective optical switch. The optical switch includes a waveguide for transmitting a multiplexed optical signal therein. The optical switch further includes an on/off switchable wavelength-selective means disposed near the waveguide for switching on the optical switch to wavelength-selectively transmit a portion of the multiplexed optical signal with selected wavelengths and for switching off the optical switch to keep on transmitting the multiplexed optical signal. In a preferred embodiment, the on/off switchable wavelength-selective means comprising a movable coupling switching means for coupling to the waveguide to wavelength-selectively transmit a portion of the multiplexed optical signal with selected wavelengths and for de-coupling from the waveguide to switch off the wavelength selective switch.

In another preferred embodiment, the on/off switchable wavelength-selective means comprising a movable coupling waveguide formed with Bragg gratings for moving close and coupling to the waveguide to wavelength-selectively transmit a portion of the multiplexed optical signal with selected wavelengths phase-matched with the Bragg gratings in the coupling waveguide and for moving away and de-coupling from the waveguide to switch off the wavelength selective switch. In another preferred embodiment, the optical switch further includes a control means for switching on and off the wavelength-selective optical switch. In another preferred embodiment, the optical switch further includes an electric control means for electrically switching on and off the wavelength-selective optical switch. In another preferred embodiment, the optical switch further includes an electrostatic control means for electrostatically switching on and off the wavelength-selective optical switch. In another preferred embodiment, the movable coupling waveguide formed with Bragg gratings further includes an electrode provided for electrically controllable to switch on the optical switch by moving close and coupling to the waveguide and to switch off the optical switch by moving away and de-coupling from the waveguide. In another preferred embodiment, the movable coupling waveguide formed with Bragg gratings is formed as a movable waveguide beam disposed near the waveguide. In another preferred embodiment, the movable coupling waveguide formed with Bragg gratings is formed as a movable waveguide bridge having bridge supports on both ends of the waveguide bridge disposed on the waveguide. In another preferred embodiment, the movable coupling waveguide formed with Bragg gratings is formed as a movable waveguide cantilever having a cantilever support on one end of the waveguide cantilever disposed on the waveguide. In another preferred embodiment, the movable coupling waveguide formed with Bragg gratings is formed as a movable waveguide dual-cantilever having dual cantilever supports on both end of the waveguide dual cantilever disposed on the waveguide.

In summary, this invention discloses an on/off controllable wavelength-selective optical switch disposed near a multiplexed optical signal transmission means. The optical switch includes an on/off switchable wavelength-selective means for switching on to wavelength-selectively transmit a portion of the multiplexed optical signal with selected wavelengths and for switching off the optical switch to keep on transmitting the multiplexed optical signal.

In all the structures described above, the grating is in "off" state at the normal position, i.e. without applying voltages. But the structures in which the grating is normally "on" can also be easily deduced from similar fabricating process.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A wavelength-selective optical switching system comprising:
   an input waveguide for receiving a multiplexed optical signal that includes a plurality of wavelength channels, wherein said input waveguide extends in a first direction;
   at least one second direction waveguide extending in a second direction and intersecting with said input waveguide to form at least one intersection; and
   at least one wavelength selective grating-based switch disposed on said intersection for selectively switching one of said plurality of wavelength channels into said second direction waveguide and for transmitting the remaining ones of said plurality of wavelength channels.

2. The wavelength-selective optical switching system of claim 1 wherein:
   said wavelength selective grating-based switch comprises Bragg gratings that have a periodicity suitable for switching said one of said plurality of wavelength channels from said first direction waveguide into said second direction waveguide.

3. The wavelength-selective optical switching system of claim 2 wherein:
   said grating-based switch can be engaged to or disengaged from said input waveguide and said second direction waveguide.

4. The wavelength-selective optical switching system of claim 3 wherein:
said wavelength selective grating-based switch comprises a movable bridge waveguide and an electrically controllable moving means for moving said movable bidge waveguide for activating said Bragg gratings.

5. The wavelength-selective optical switching system of claim 4 wherein:
at least one of said electrically controllable moving means is an electrostatic moving means for moving said movable bridge waveguide for activating said Bragg gratings.

6. The wavelength-selective optical switching system of claim 1 further comprising:
at least one first direction waveguide that intersects said second direction waveguides, said first direction waveguide having an optical port for connecting to an optical device.

7. The wavelength-selective optical switching system of claim 1 further comprising:
a residual input-signal optical port disposed on said input waveguide provided for connecting and transmitting a residual input optical signal to an optical device.

8. The wavelength-selective optical switching system of claim 1 further comprising:
a plurality of residual optical signal detectors each disposed on one of said second direction waveguides for measuring a residual optical signal.

9. The wavelength-selective optical switching system of claim 1 further comprising:
a plurality of optical ports disposed on one of said first direction waveguides for connecting and transmitting an optical signal to an optical device.

10. A wavelength-selective optical switching system comprising:
a waveguide array for receiving a multiplexed optical signal comprising optical signals transmitted over a plurality of wavelength channels, said waveguide array having a plurality of intersecting waveguides intersecting at a plurality of waveguide intersections; and
at least one wavelength selective grating-based switching means disposed on at least one of said waveguide intersections for wavelength selectively switching an optical signal from a first waveguide to an intersecting waveguide.

11. The wavelength-selective optical switching system of claim 10 wherein:
said wavelength selective grating-based switching means comprises Bragg gratings having a periodicity adapted for switching one of said plurality of wavelength channels from said first waveguide to said intersecting waveguide.

12. The wavelength-selective optical switching system of claim 10 wherein
said wavelength selective grating-based switching means comprises a bridge waveguide having a first Bragg grating coupled to said first waveguide and a second Bragg grating coupled to said intersecting waveguide, said first Bragg grating having a periodicity adapted for reflecting one of said plurality of wavelength channels from said first waveguide into said second Bragg grating for further coupling into said intersecting waveguide.

13. The wavelength-selective optical switching system of claim 12 wherein
said bridge waveguide is a movable bridge waveguide for on/off switching said wavelength selective grating-based switching means by engaging and disengaging said first and second Bragg gratings to and from said first waveguide and said intersecting waveguide.

14. A wavelength-selective bridge means disposed between a first waveguide and a second waveguide comprising:
an optical switch coupled between said wavelength-selective bridge means and said first waveguide for switching an optical signal to transmit on said first waveguide or said wavelength-selective bridge means; and
a plurality Bragg gratings provided for wavelength selectively transmitting an optical signal of a central wavelength particular to said Bragg gratings from said wavelength-selective bridge means to said second waveguide.

15. The wavelength-selective bridge means of claim 14 wherein:
said second waveguide intersecting said first waveguide.

16. A wavelength-selective optical switching system comprising:
an input waveguide designated as waveguide WG(0) for receiving a multiplexed optical signal comprising optical signals transmitted over a plurality of wavelength channels represented by $\lambda_1, \lambda_2, \lambda_3, \ldots, \lambda_N$, where N is a positive integer wherein said input waveguide extending over a first direction;
a two dimensional waveguide array comprising a plurality of first direction waveguides WG(i), i=1, 2, 3, ..., M extending over said first direction substantially parallel to said input waveguide WG(0) where M is a positive integer and a plurality of second direction waveguides WG'(j), j=1, 2, 3, ... N, extending over a second direction substantially perpendicular to said first direction and intersecting with said input waveguide and each of said first direction waveguide WG(i), i =0, 1, 2, 3, ..., M, thus forming (M+1)×N intersections; and
a plurality of wavelength selective grating switching means SW(i, j) where i=0, 1, 2, 3, ..., M and j=1, 2, 3, ..., N each disposed on one of said (M+1)×N intersections for selectively transmitting an optical signal of wavelength λj into a waveguide WG'(j) and for selectively transmitting an optical signal of a predefined combination of wavelengths into at least one of said waveguide WG(i) for i=1, 2, 3, ..., M.

17. The wavelength-selective optical switching system of claim 16 wherein:
each of said plurality of wavelength selective grating switching means SW(i, j) where i=0, 1, 2, ..., M and j=1, 2, 3, ..., N, further comprising Bragg gratings provided for wavelength selectively transmitting an optical signal of a central wavelength particular to said Bragg from a first waveguide WG(i) to a second waveguide WG'(j) intersecting said first waveguide WG(i).

18. The wavelength-selective optical switching system of claim 16 wherein:
each of said plurality of wavelength selective, grating switching means SW(i, j) where i=0, 1, 2, ..., M and j=1, 2, 3, ..., N, further comprising a bridge waveguide WGB(i, j) wherein said WGB(i, j) having a first set of Bragg gratings coupled to said waveguide WG(i) and a second set of Bragg gratings coupled to said waveguide WG'(j)

said first set of Bragg gratings are provided for wavelength selectively transmitting an optical signal of a central wavelength particular to said first set of Bragg gratings from said waveguide WG(i) to said WGB(i, j) and said second set of Bragg gratings are provide for transmitting said optical signal of a central wavelength particular to said second set of Bragg gratings from said bridge waveguide WGB(i, j) to an intersecting waveguide WG'(j).

19. The wavelength-selective optical switching system of claim 18 wherein:

at least one of said bridge waveguide WGB(i, j) is a movable bridge waveguide for on/off switching said wavelength selective grating switch SW(i,j) by engaging and disengaging said first and second sets of Bragg gratings to and from said waveguides WG(i) and WG'(j).

20. The wavelength-selective optical switching system of claim 16 wherein:

at least one of said plurality of wavelength selective grating switching means SW(i,j) where i=0, 1, 2, . . . , M and j=1, 2, 3, . . . , N, further comprising movable Bragg gratings provided for wavelength selectively transmitting an optical signal of a central wavelength particular to said Bragg gratings from a first waveguide WG(i) to a second waveguide WG'(j) intersecting said first waveguide WG(i) whereby said wavelength selective grating switching means is a on/off switchable switching means.

21. The wavelength-selective optical switching system of claim 20 wherein:

at least one of said plurality of wavelength selective grating switching means SW(i, j) where i=0, 1, 2, . . . , M and j=1, 2, 3, . . . , N, further comprising an electrically controllable moving means for moving said movable Bragg gratings for activating said Bragg gratings for wavelength selectively transmitting an optical signal of a central wavelength particular to said Bragg gratings from a first waveguide WG(i) to a second waveguide WG'(j) intersecting said first waveguide WG(i) whereby said wavelength selective grating switching means is a on/off switchable switching means.

22. The wavelength-selective optical switching system of claim 21 wherein:

at least one of said electrically controllable moving means is an electrostatic moving means for moving said movable Bragg gratings for activating said Bragg gratings.

23. The wavelength-selective optical switching system of claim 16 wherein:

each of said plurality of wavelength selective grating switching means SW(i, j) where i=1, 2, 3, . . . , M, and j=1, 2, 3,. . . , N, each disposed on one of said MXN intersections is an on/off switchable wavelength selective grating switching means for selectively transmitting an optical signal of a predefined combination of wavelengths into at least one of said waveguide WG(i) for i=1, 2, 3, . . . M.

24. The wavelength-selective optical switching system of claim 16 further comprising:

a plurality of optical ports each disposed on one of said waveguides WG'(j) provided for connecting to an optical device.

25. The wavelength-selective optical switching system of claim 16 further comprising:

A residual input-signal optical port disposed on said input waveguide WG(0) provided for connecting and transmitting a residual input optical signal to an optical device.

26. The wavelength-selective optical switching system of claim 16 wherein:

each of said plurality of wavelength selective grating switching means SW(0, j) where j=1, 2, 3, . . . , N, each disposed on one of said N intersections is an non-switchable wavelength selective grating switching means for selectively transmitting an optical signal of wavelength $\lambda j$ into a waveguide WG'(j).

27. The wavelength-selective optical switching system of claim 16 further comprising:

a plurality of residual optical signal detectors each disposed on one of said waveguides WG'(j) for measuring a residual optical signal.

28. The wavelength-selective optical switching system of claim 16 further comprising:

an input residual optical signal detector disposed on said input waveguide WG(0) for measuring a residual input optical signal.

29. A wavelength-selective optical switching system comprising:

a waveguide array receiving a multiplexed optical signal comprising optical signals transmitted over a plurality of wavelength channels represented by $\lambda_1, \lambda_2, \lambda_3, \ldots, \lambda_N$, where N is a positive integer, said waveguide array having a plurality of intersecting waveguides intersecting on a plurality of waveguide intersections; and at least a wavelength selective grating switching means disposed on at least one of said intersections for wavelength selectively switching an optical signal from a first waveguide to an intersecting waveguide.

30. The wavelength-selective optical switching system of claim 23 wherein:

said wavelength selective grating switching means further comprising Bragg gratings provided for wavelength selectively transmitting an optical signal of a central wavelength particular to said Bragg gratings from said first waveguide to said intersecting waveguide.

31. The wavelength-selective optical switching system of claim 23 wherein:

said wavelength selective grating switching means further comprising a bridge waveguide having a first set of Bragg gratings coupled to said first waveguide and a second set of Bragg gratings coupled to said intersecting waveguide;

said first set of Bragg gratings are provided for wavelength selectively transmitting an optical signal of a central wavelength particular to said first set of Bragg gratings from said first waveguide to said bridge waveguide and said second set of Bragg gratings are provide for transmitting said optical signal of a central wavelength particular to said second set of Bragg gratings from said bridge waveguide to said intersecting waveguide.

32. The wavelength-selective optical switching system of claim 31 wherein:

said bridge waveguide is a movable bridge waveguide for on/off switching said wavelength selective grating-based switch by engaging and disengaging said first and second sets of Bragg gratings to and from said first waveguides and said intersecting waveguide.

33. The wavelength-selective optical switching system of claim 23 wherein:

said wavelength selective grating switching means further comprising movable Bragg gratings provided for wavelength selectively transmitting an optical signal of a central wavelength particular to said Bragg gratings from a first waveguide to an intersecting waveguide whereby said wavelength selective grating switching means is a on/off switchable switching means.

34. The wavelength-selective optical switching system of claim 23 wherein:

one of said waveguide constituting an input waveguide for receiving a multiplexed optical signal comprising optical signals transmitted over a plurality of wavelength channels represented by $\lambda_1, \lambda_2, \lambda_3, \ldots, _N$; and said wavelength selective grating switching means disposed on one of said intersections on said input waveguide for wavelength selectively switching an optical signal from said input waveguide of a particular input wavelength $\lambda j$, where $\lambda j$ is one of the wavelengths $\lambda_1, \lambda_2, \lambda_3, \ldots, \lambda_N$, to an intersecting waveguide.

35. The wavelength-selective optical switching system of claim 23 wherein:

one of said waveguide constituting an input waveguide for receiving a multiplexed optical signal comprising optical signals transmitted over a plurality of wavelength channels represented by $\lambda_1, \lambda_2, \lambda_3, \ldots, \lambda_N$; and said wavelength selective grating switching means disposed on one of said intersections on said input waveguide further comprising non-movable Bragg gratings for wavelength selectively transmitting an optical signal of wavelength $\lambda j$ into said intersecting waveguide.

36. The wavelength-selective optical switching system of claim 23 wherein:

said wavelength selective grating switching disposed on one of said intersections is an on/off switchable wavelength selective grating-based switching means for selectively transmitting an optical signal of a predefined combination of wavelengths into at least one of said intersecting waveguides.

37. The wavelength-selective optical switching system of claim 23 comprising:

A plurality of residual optical signal detectors disposed on one of said waveguides for measuring a residual optical signal.

38. A wavelength-selective grating-based switching means disposed on an intersection between a first waveguide and an intersecting waveguide comprising:

a plurality Bragg gratings provided for wavelength selectively transmitting an optical signal of a central wavelength particular to said Bragg gratings from said first waveguide to said intersecting waveguide.

39. The wavelength-selective grating-based switch of claim 38 further comprising:

a bridge waveguide includes a first set of Bragg gratings coupled to said first waveguide and a second set of Bragg gratings coupled to said intersecting waveguide;

said first set of Bragg gratings are provided for wavelength selectively transmitting an optical signal of a central wavelength particular to said first set of Bragg gratings from said first waveguide to said bridge waveguide and said second set of Bragg gratings are provide for transmitting said optical signal of a central length particular to said second set of Bragg gratings from said bridge waveguide to said intersecting waveguide.

40. The wavelength-selective grating-based switch of claim 39 wherein:

said bridge waveguide is a movable bridge waveguide for on/off switching said wavelength selective grating-based switch by engaging and disengaging said first and second sets of Bragg gratings to and from said first waveguides and said intersecting waveguide.

41. The wavelength-selective grating-based switch of claim 38 further comprising:

movable Bragg gratings provided for wavelength selectively transmitting an optical signal of a central wavelength particular to said Bragg gratings from a first waveguide to an intersecting waveguide whereby said wavelength selective grating-based switching means is a on/off switchable switching means.

42. A wavelength-selective optical transmission system comprising:

a bus waveguide for transmitting a multiplexed optical signal therethrough;

a wavelength-selective bridge waveguide comprising a plurality Bragg gratings for moving to said bus waveguide for selectively transmitting an optical signal with a central wavelength within a spectral range and particular to said Bragg gratings from said bus waveguide to said wavelength-selective bridge waveguide, and for moving from said bus waveguide for switching off said wavelength-selective bridge guide from said bus waveguide; and a second waveguide for coupling to and receiving said optical signal with a central wavelength particular to said Bragg gratings from said wavelength-selective bridge waveguide.

43. The wavelength-selective optical transmission system of claim 42, wherein:

said second waveguide further comprising a plurality of Bragg gratings of a identical pitch with said Bragg gratings on said wavelength-selective bridge waveguide for coupling to and receiving said optical signal with a central wavelength particular to said Bragg gratings from said wavelength-selective bridge waveguide.

44. The wavelength-selective optical transmission system of claim 42, further comprising:

an optical coupler for coupling said second waveguide to said wavelength-selective bridge waveguide for coupling to and receiving said optical signal therefrom.

45. A wavelength-selective bridge means disposed between a first waveguide and a second waveguide comprising:

a plurality Bragg gratings provided for wavelength selectively transmitting an optical signal of a central wavelength particular to said Bragg gratings from said first waveguide to said second waveguide.

46. The wavelength-selective bridge means of claim 45 wherein:

said second waveguide intersecting said first waveguide.

47. A wavelength-selective bridge means disposed on an intersection between a first waveguide and an intersecting waveguide comprising:

a plurality Bragg gratings provided for wavelength selectively transmitting an optical signal of a central wavelength particular to said Bragg gratings from said first waveguide to said intersecting waveguide.

48. The wavelength-selective bridge means of claim 47 wherein:

said Bragg gratings coupled to said first waveguide and said second waveguide.

49. The wavelength-selective bridge means of claim 47 wherein:

said Bragg gratings coupled of said wavelength-selective bridge means disposed near said first waveguide and said wavelength-selective bridge means is coupled to said second waveguide.

50. The wavelength-selective bridge means of claim 47 further comprising:

an optical coupler for coupling said wavelength-selective bridge means to said second waveguide.

51. The wavelength-selective bridge means of claim 47 wherein:

said Bragg gratings constituted movable Bragg gratings for on-off movable to and from said first waveguide.

* * * * *